(12) United States Patent
Danker et al.

(10) Patent No.: US 10,085,064 B2
(45) Date of Patent: *Sep. 25, 2018

(54) AGGREGATION OF MEDIA EFFECTS

(71) Applicant: Facebook, Inc., Menlo Park, CA (US)

(72) Inventors: Daniel Danker, San Francisco, CA (US); David J. Capra, San Francisco, CA (US); Tory Hargro, Foster City, CA (US)

(73) Assignee: FACEBOOK, INC., Menlo Park, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 15/392,839

(22) Filed: Dec. 28, 2016

(65) Prior Publication Data

US 2018/0184171 A1    Jun. 28, 2018

(51) Int. Cl.
*H04N 21/2343* (2011.01)
*H04N 21/25* (2011.01)
*H04N 21/475* (2011.01)
*H04N 21/4402* (2011.01)
*H04N 21/4627* (2011.01)

(52) U.S. Cl.
CPC ..... *H04N 21/4758* (2013.01); *H04N 21/4402* (2013.01); *H04N 21/4627* (2013.01)

(58) Field of Classification Search
CPC .......................... H04N 21/252; H04N 21/2343
USPC ............................................. 725/13, 24, 136
See application file for complete search history.

(56) References Cited

U.S. PATENT DOCUMENTS

| 6,298,482 | B1* | 10/2001 | Seidman | ............ | H04N 5/44543 348/E5.105 |
| 2011/0060992 | A1 | 3/2011 | Jevons et al. | | |
| 2013/0147904 | A1 | 6/2013 | Vivekanandan, et al. | | |
| 2014/0240445 | A1 | 8/2014 | Jaynes | | |
| 2014/0282650 | A1* | 9/2014 | Viles | ................ | H04N 21/23424 725/13 |
| 2016/0127681 | A1 | 5/2016 | Turbell | | |

FOREIGN PATENT DOCUMENTS

WO    2016-154426 A1    9/2016

OTHER PUBLICATIONS

International Search Report received for PCT Patent Application No. PCT/US2016/069306, dated Oct. 18, 2017, 3 pages.

\* cited by examiner

*Primary Examiner* — Dominic D Saltarelli

(57) ABSTRACT

Exemplary embodiments relate to techniques for applying media effects to a video stream. For example, media effects may be applied and/or altered based on input from viewers or participants in the video stream. Changes to the media effects may accumulate based on the inputs. In another example, viewership numbers or engagement with a user applying a media effect may alter the media effect. In a broadcast context, actions of the broadcast audience (e.g., as measured by polling) may affect the broadcast and hence the broadcaster. Object recognition and/or people recognition may be applied to cumulatively alter the media effects in an augmented reality context.

15 Claims, 18 Drawing Sheets

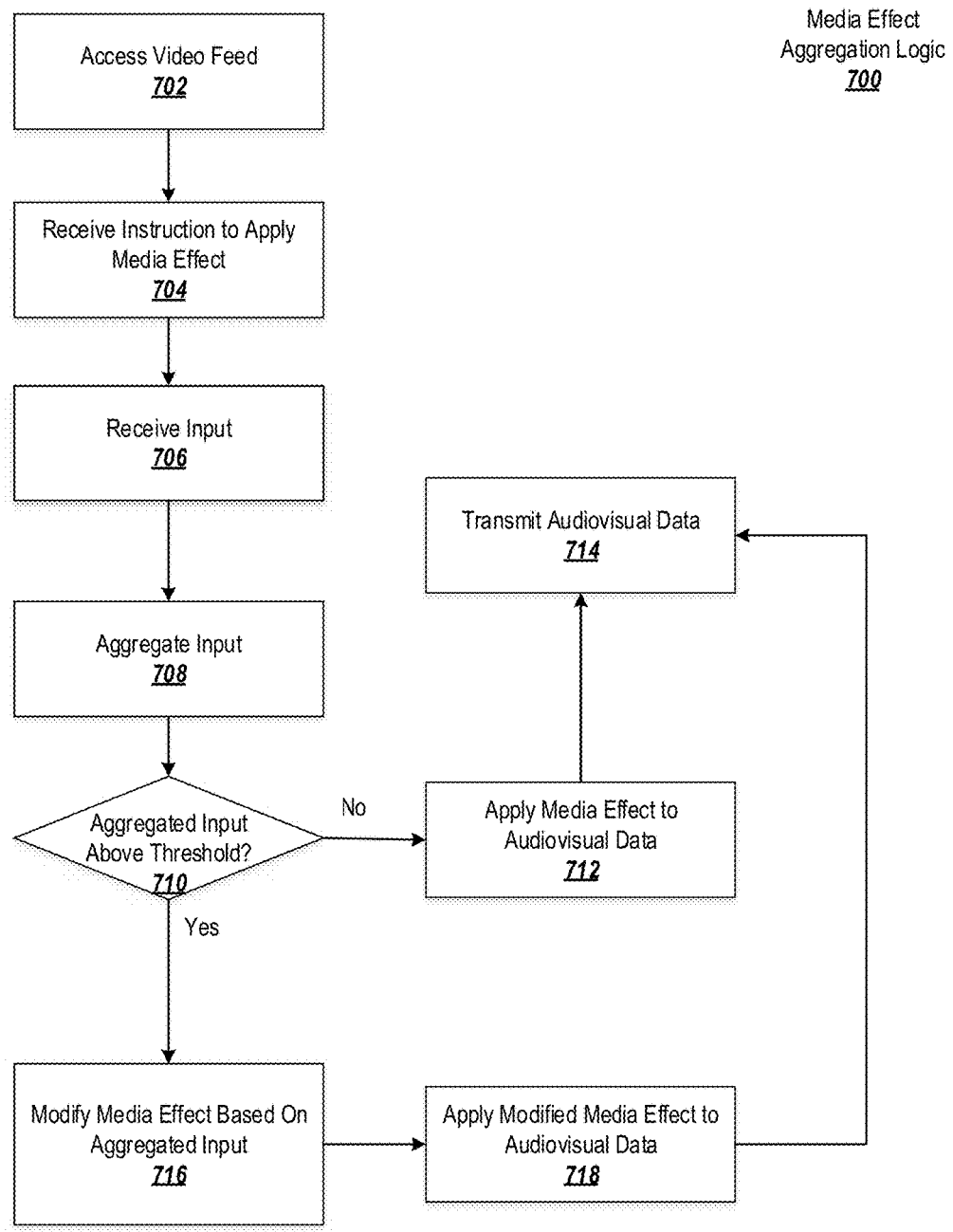

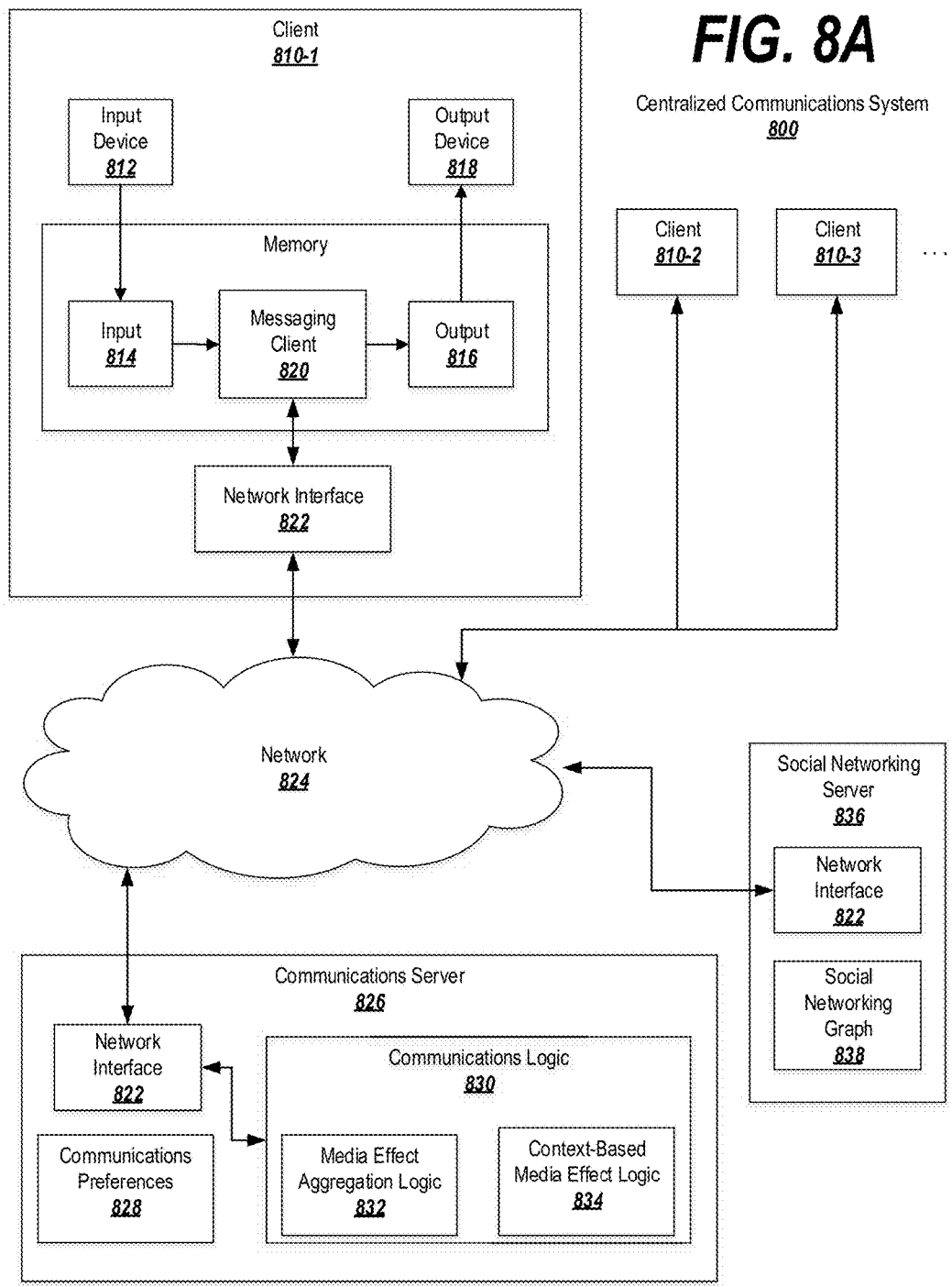

Distributed Communications System 850

AGGREGATION OF MEDIA EFFECTS

RELATED APPLICATIONS

This application is related to the United States Patent Application titled "Context-Based Media Effect Application," Ser. No. 15/392,845, filed on Dec. 28, 2016, which is hereby incorporated by reference in its entirety.

BACKGROUND

Facial detection technology allows for the detection of a face in a photo or video, and in some cases allows for individuals to be identified based on their facial characteristics. Recently, facial detection techniques have been used to apply overlays on faces, such as by adding a graphical mask over a face in a video.

BRIEF DESCRIPTION OF THE DRAWINGS

FIG. 7 is a flowchart depicting exemplary logic for aggregating inputs to alter a media effect.

FIG. 8A is a block diagram providing an overview of a system including an exemplary centralized communications service;

DETAILED DESCRIPTION

Figure 1A:
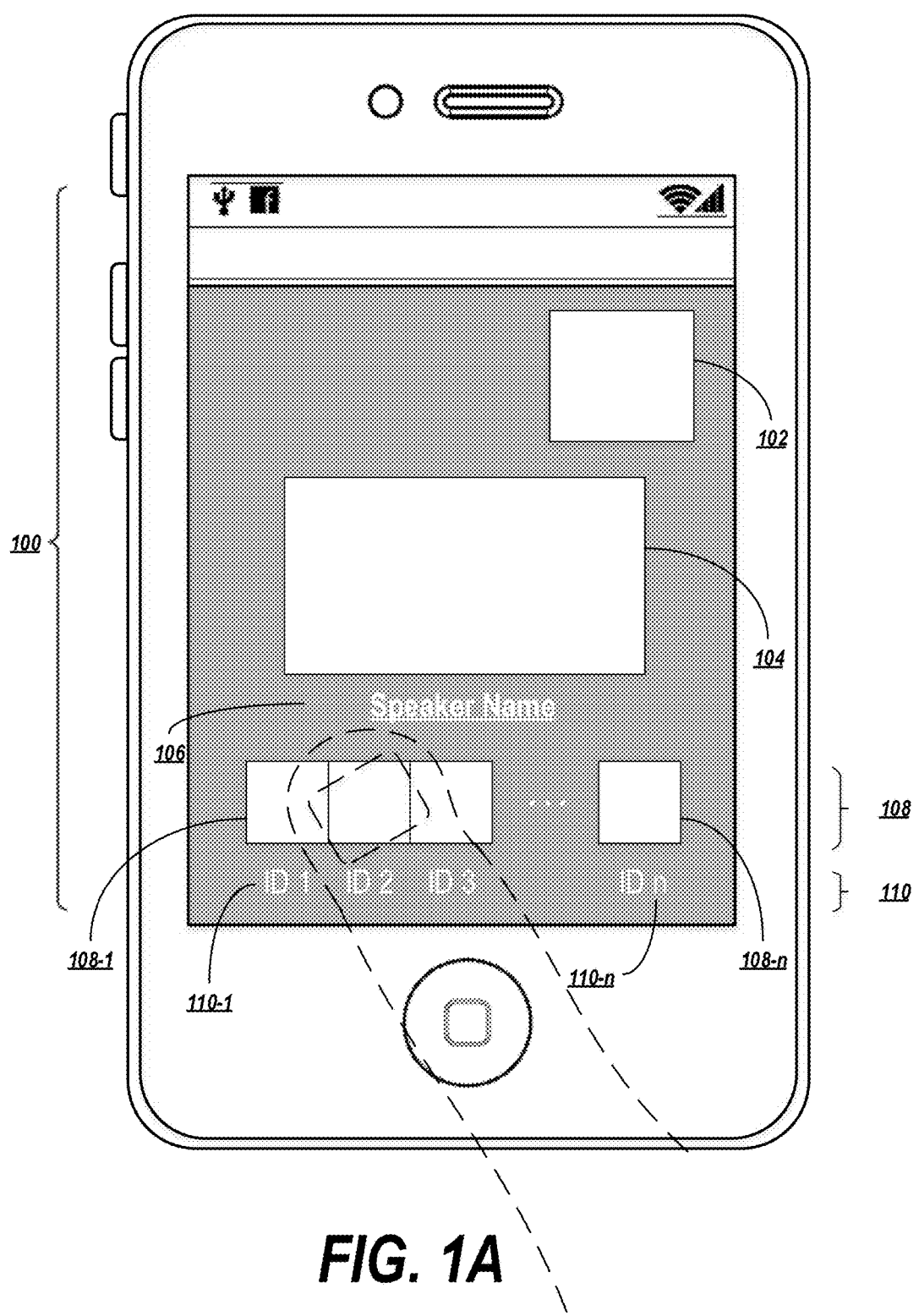
FIG. 1A depicts an exemplary interface for a video communication.

In addition to or instead of facial overlays, a number of media effects may be applied during a video communication. For example, musical sound effects may be played, filters may be applied, other types of graphical modifications may be made, etc. These media effects may be applied manually by a user (e.g., the user for whom the video stream is generated or a user viewing the video stream) or may be applied automatically (e.g., based on a detected emotion).

Exemplary embodiments relate to the application of such media effects to a video stream using techniques that allow the media effects to be dynamic, personal, and social. According to some embodiments, media effects may be enabled, applied, or modified based on aggregated input. For example, users may affect the media effects applied in a live stream, group call, etc. in a collective way. The inputs may include, for example, active behaviors such as interacting with the video stream (e.g., "liking" or commenting on the video stream) or a media effect in the video stream, and/or passive statuses or attributes such as the number of viewers of the video stream.

A media effect may be altered and/or may be enabled by cumulative active or passive behavior. More specifically, cumulative behavior may make effects available to a broadcaster or viewing user that were not otherwise available absent the cumulative behavior. For example, in a video stream featuring a cloud in the background users may tap on the cloud to enable a rain animation on the cloud where no animation was previously present. Further input (e.g., more tapping above a certain threshold) may alter the applied media effect (e.g., resulting in a lightning animation).

The resulting changes may be cumulative; for instance, multiple users may "pull" on a graphical mask overlay, which causes the mask to stretch in a manner based on the cumulative "pulling" vectors of the multiple users. In other examples, users need not necessarily interact with the media effect in order to have a cumulative effect. For instance, viewership numbers or engagement with a steaming user applying a media effect may alter the media effect (e.g., a live broadcaster wearing a lei may receive a more elaborate set of flowers depending on the number of viewers, comments, etc. received).

Object recognition and/or people recognition may be applied to cumulatively alter the media effects in augmented reality (A/R). In one example, logos or other media may be overlaid onto a recognized surface, object, or person in a video stream. Cumulative interaction among participants or viewers of the video stream may enable an effect or affect the effect applied to the recognized person/object.

In a broadcast context, the actions of the audience (e.g., as measured by polling) may affect the broadcast. For example, audience polling may be used to select the direction that a broadcaster walks or the actions that a broadcaster takes. In another example, audience participation may be used to automatically change the background or some other attribute of a broadcast (e.g., without input or confirmation from the broadcaster). As a result, in some embodiments, the broadcaster may not necessarily be fully in control of all aspects of the broadcast, which may result in a feedback loop in which the broadcaster takes action to receive more engagement, which then affects the broadcaster's media effects, which cause the broadcaster to take further actions to receive more engagement.

Aggregated media effects may be applied for gamification purposes. For example, multiple users may click rapidly on their screens during a broadcast of a runner. The faster the viewing users click, the faster the runner may appear to move on a generated track.

Media effects may be associated with tiers, where the tiers are themselves associated with threshold amounts of activity or engagement. For example, a media effect such as a mask or a hat overlay may become more elaborate at higher tiers. Users may unlock or activate the higher tiers by achieving threshold amounts of engagement (e.g., escalating viewership numbers) in their video stream. In some cases, media effect application or modification may be associated with a minimum threshold, below which the media effect is not applied or modified. In other examples, media effects may be applied and/or modified in a continuous manner, becoming (e.g.) more elaborate with each accumulated input.

In some embodiments, broadcasters may be provided with a measure of control over applied media effects. For example, when viewer participant meets a predetermined threshold, an effect application or modification may be triggered. However, the broadcaster may be provided with an option to cancel application or modification of the media effect.

Further embodiments, which may be used in conjunction with the embodiments described above, relate to context-sensitive media effects. Contextual information about a video stream and/or the objects or participants in the video stream may be supplied by sensors (e.g., wearable sensors such as fitness sensors), a social networking service, third-party information sources, etc.

In some embodiments, object or person recognition may be applied to a scene to help define the context and apply A/R media effects. For instance, a system may apply object recognition to understand a scene, and add a media effect based on that understanding. In one example, a user may point a camera at an object such as a house, and the system may add media effects to the object (such as making smoke come out of a chimney, or having rainbows shoot out of the windows).

In addition to adding media effects based on the context, the context may also be used to alter a media effect. For example, if a fitness tracker indicates that a person has recently engaged in a strenuous workout, then an applied media effect may show the person with extra-large muscles or sweat. In this example, workout quality may be measured (e.g.), based on one or more sensor outputs, such as steps taken, average heart rate, maximum heart rate, galvanic skin response, etc. If one, multiple, or a combination of metrics is above a predetermined threshold, then the system may identify the workout as strenuous. In another sensor-based example, users may sing along with a celebrity in a video stream. The user who is most on-pitch may be animated into the broadcast alongside the celebrity.

In another example, knowledge of the local environment or weather may be used to modify a media effect, such as animating a person dripping when it is raining outside or showing beams of light during a sunset. Still further, if an information source (such as a third-party information source) indicates that a person's favorite sports team is playing, a media effect may be applied to show the person dressed in the uniform of the team. If the team is currently winning or losing, associated media effects may be applied or the applied media effects may be altered accordingly.

In another example, social graph data from a social networking service may be used to generate or alter a media effect. For instance, a birthday hat may be applied to a person whose social network data indicates that it is their birthday today. Other events, such as anniversaries, engagements, becoming friends with a new person, etc. may also be associated with particular media effects.

Furthermore, in certain contexts one user may be allowed to apply or alter a media effect of another person (e.g., a personal trainer applying a media effect to a participant in a group fitness class). Other users may affect a media effect for gamification purposes, as well (e.g., a runner on a displayed track may be shown to run faster over the track, and cheering noises may be applied, depending on viewer interactions with the broadcast).

This brief summary is intended to serve as a non-limiting introduction to the concepts discussed in more detail below. However, before discussing further exemplary embodiments, a brief note on data privacy is first provided. A more detailed description of privacy settings and authentication will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video communication in a messaging system is next provided As an aid to understanding, a series of examples will first be presented before detailed descriptions of the underlying implementations are described. It is noted that these examples are intended to be illustrative only and that the present invention is not limited to the embodiments shown.

Exemplary Interfaces

Next, exemplary interfaces for applying media effects, including altered media effects as described below, are presented.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

FIG. 1A depicts an interface 100 for a communications application adapted to show a group, one-to-one, or one-to-many video communication. The interface 100 may be displayed on the device of a first user. Although particular examples are provided below, more or fewer elements, or different combinations of elements, may be provided (e.g., depending on the type of video communication being presented). For example, a one-to-one video communication may omit the roster 108. In a one-to-many video communication, both the roster 108 and the preview window 102 may be omitted, in favor of a more prominent main window 104. Some other differences between video call types are described in more detail below.

The interface 100 may include a preview window 102, in which the first user can see the video stream that they are transmitting.

The interface 100 may further include a main window 104 that may display a relevant communication stream. For example, in the case of a one-to-one communication, the main window 104 may show the other participant in the call. In the case of a group communication, the speaker that has been currently selected as most-relevant may be shown. In the case of a one-to-many communication, the main window 104 may show a view of the video stream that the broadcasting participant is transmitting. The main window 104 may be the most prominent window in the interface 100, and may display a video stream that is larger in size and/or at a higher resolution than the video in the preview window 102 or other windows (such as the roster 108 described below).

Optionally, the participant displayed in the main window 104 may be identified on the interface 100 by an identifier 106. The identifier 106 may be, for example, the name or handle of the participant displayed in the main window 104.

A roster 108 of participants in the call may also be displayed. The roster 108 may include a window 108-i dedicated to each participant in the call, or may exclude the currently-relevant speaker displayed in the main window 104. Each window 108-i may display a video stream of the associated participant (if such a stream is available). The roster 108 may be associated with some functionality. For example, selecting one of the windows 108-i (as shown in FIG. 1A) may lock the selected participant to the main window for a period of time (or until the locking is manually canceled, or until an event occurs, such as another video stream becoming most relevant). Alternatively or in addition, selecting a window 108-i may cause additional information about the associated participant to be displayed, among other possibilities. The windows 108-i of the roster 108 may each be associated with an identifier 110-i identifying the participant in the window 108-i. The identifier 110-i may be, for example, a name or handle of the participant. In some cases, the participant may be associated with a long identifier and a short identifier (e.g., a full name and a nickname, or a full name and a first name only). In some embodiments, the short identifier may be displayed as the identifier 110-i, while the longer identifier may be displayed as the identifier 106 for the main window 104.

Figure 1B:
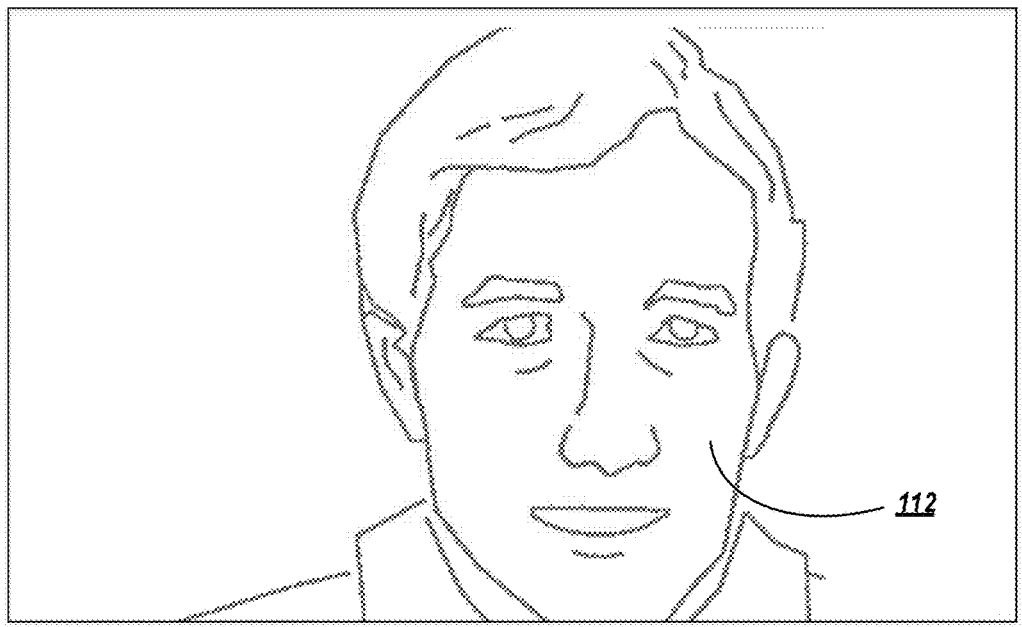
FIG. 1B depicts an exemplary frame from a video communication.
Figure 1C:
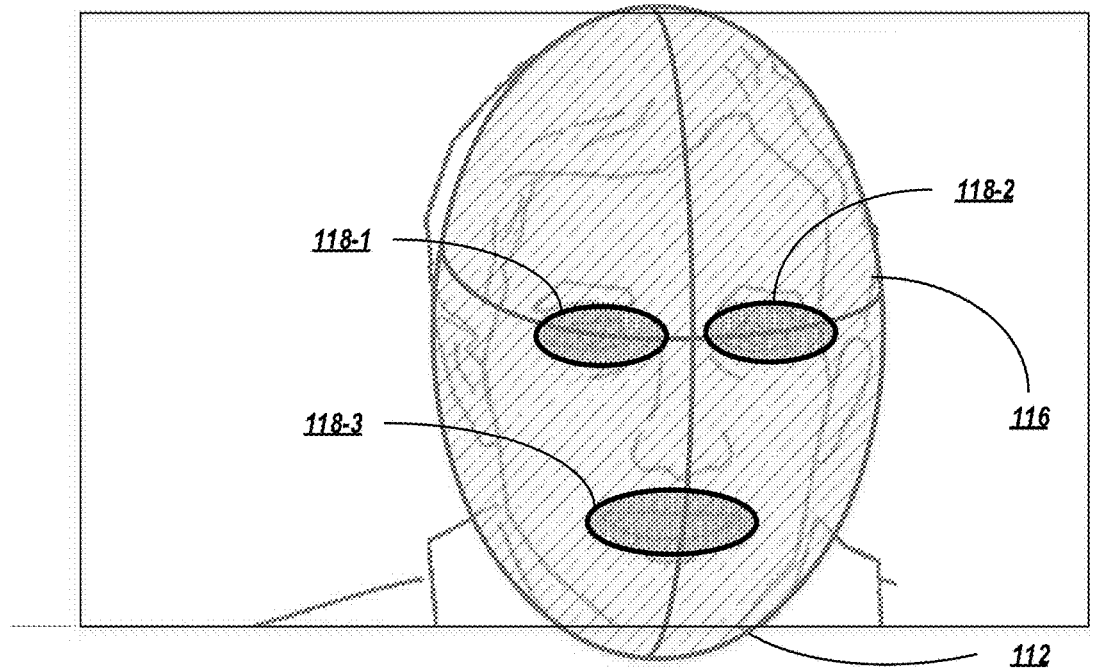
FIG. 1C depicts aspects of an exemplary technique for performing emotion detection.

FIG. 1B depicts an exemplary frame from a video communication. The frame may be, for example, an image from a video stream. The frame may include a participant's face 112. Analysis of the face 112 may be used to perform emotion detection, as shown in FIG. 1C.

Facial detection techniques may be applied to determine a bounding shape 116 that substantially contains the user's face 112. In some cases, it may be difficult to entirely encompass the user's face with a relatively simple bounding shape 116, and so some small portions of the face may extend beyond the boundaries of the bounding shape 116. Furthermore, because few people have perfectly square or oval faces, the bounding shape 116 may include some areas that do not contain the user's face. Preferably, the bounding shape 116 is sized and shaped so as to fit as much of the user's face in as possible, while avoiding encompassing areas that do not include the face. Further preferably, the bounding shape 116 is a relatively simple shape, such as a square or oval, rather than a relatively complex shape, such as a trapezoid or freeform curve.

Optionally, one or more axes of the bounding shape 116 may be defined. In the depicted example, the facial detection technique involves identifying features of the face, such as the ears, eyes, nose, and mouth. A vertical axis extends vertically through the approximate center of the face, splitting the eyes, nose, and mouth in half. A horizontal axis extends horizontally through the approximate center of the face, approximately through the ears and eyes.

The face may also be analyzed to identify especially expressive features, which may be particularly relevant to emotion detection. For example, the region corresponding to the eyes and mouth may be considered to be more expressive than (e.g.) the ears or hair. Accordingly, one or more expressive regions 118-1, 118-2, 118-3 may be drawn around the expressive features and analyzed for indications of emotion type (e.g., upturned or downturned mouth, raised or lowered eyebrows, furrowed brow, etc.). In some cases, multiple faces may be detected in the video stream. Accordingly, this procedure may be repeated for each face detected in the stream. The same or different media effects may be applied to multiple users.

As an alternative or in addition to the techniques above, other inputs may be used to perform emotion detection. For example, an audio stream may be analyzed to detect changes in a user's voice. If multiple voices are detected in the audio stream, audio analysis may be performed to detect changes in each user's voice. Other sensor data may be used to detect characteristics associated with emotional states, as well. For instance, a heart rate monitor may detect an increased or decreased pulse; a fingerprint sensor may measure skin conductivity; an accelerometer or orientation sensor may detect a user's hand stability as the user holds their mobile device, etc. These and other characteristics may be associated with certain emotional states.

Figure 1D:
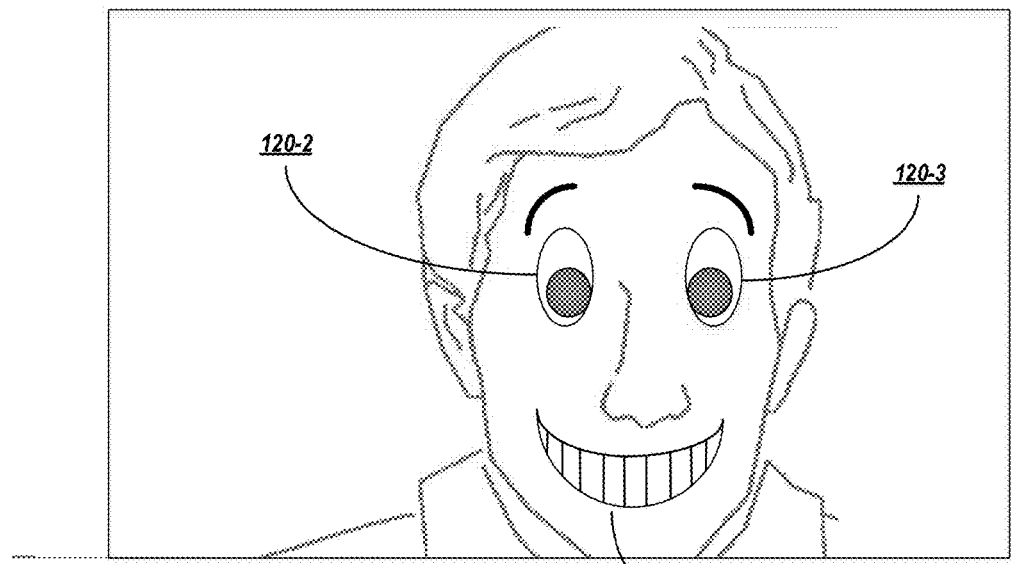
FIG. 1D depicts an exemplary interface in which a media effect is applied to a user based on a detected emotion.

After the user's emotional state is detected, the system may automatically apply a media effect associated with the detected emotional state. FIG. 1D depicts an exemplary interface in which media effects 120-1, 120-2, 120-3 are applied to a user based on a detected emotion. In this case, the system has detected a "happy" emotional state and applied a "happy" media effect (a graphical overlay with an exaggerated animation showing a smile and happy eyes).

The system may select and automatically apply a default media effect associated with the emotional state. Alternatively, the system may select and apply a media effect based on user preferences (e.g., a predetermined media effect selected by the user in advance and/or stored in a user profile, such as a profile associated with the messaging service or an associated social networking service), and/or based on previous user-applied media effects (e.g., media effects that the user has previously selected for application, particularly when applied during or close in time to the occurrence of the same or a similar emotional state as the detected emotional state).

Multiple different media effects may be associated with an emotional state. In some embodiments, upon detecting an emotional state, the system may display an indication of the emotional state (e.g., an icon associated with the emotional state, or text identifying the emotional state). A user may select one of the multiple media effects associated with the emotional state through different inputs. For example, on a touch display, a user may swipe left to apply a first media effect, swipe up to apply a second media effect, etc. In another example, a user may move the camera left, right, up, down, etc. to apply different media effects. Other techniques for selecting among predetermined or preselected media effects may also be used.

The media effect may be added to the user's video stream and broadcast to other users, so that other participants in the communication may experience the media effect. If multiple users are detected in a video stream, then emotional states may be detected for each user. The above-described process may be repeated for each user for whom an emotional state was detected, and multiple media effects may be applied in a single video stream.

Figure 1E:
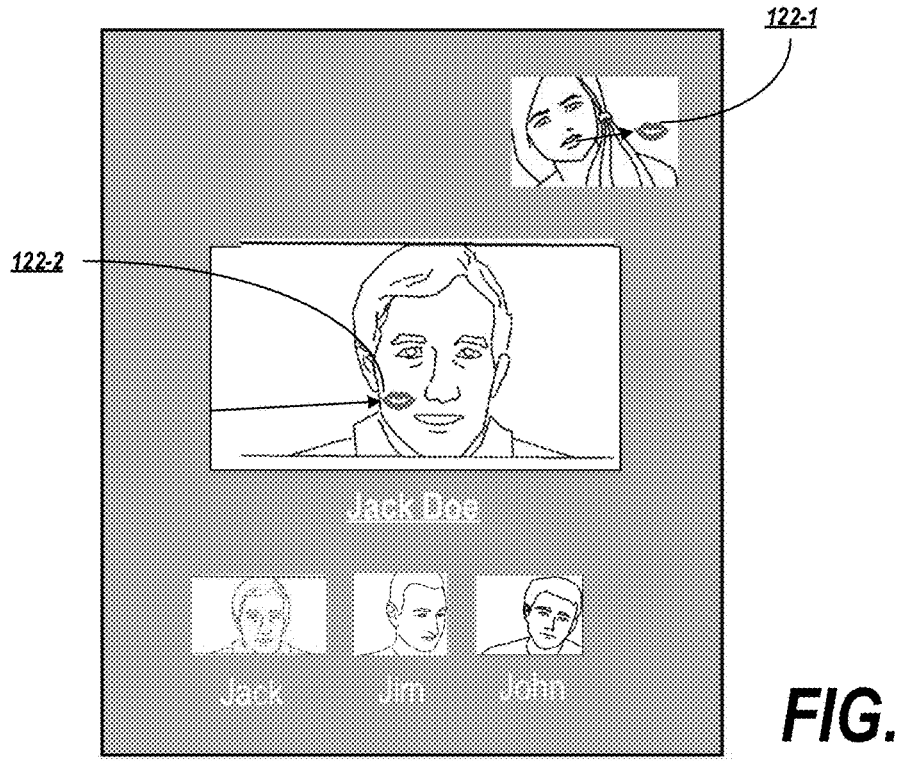
FIG. 1E depicts an exemplary interface in which a media effect is applied to multiple users based on a detected emotion.

In some embodiments, a media effect may apply to a different participant than the participant who applied the media effect, or may apply to multiple users in a coordinated manner. For example, FIG. 1E depicts an interface in which a media effect is applied to multiple users based on a detected emotion.

In this case, the system detected an emotional state (e.g., a romantic emotional state) associated with a first participant (Jill) directed to a second participant (Jack). The system therefore applies a romantic media effect to both Jill's and Jack's video streams. In this case, an animated kissing media effect 122-1 appears in Jill's display, initially centered on Jill's mouth. The effect 122-1 appears to fly to the edge of Jill's screen and disappears. It reappears as a media effect 122-2 on Jack's display and flies to Jack's cheek. Each participant in the communication is able to see this coordinated media effect. Other examples may include animating an angry user's face as a dragon and showing the user breathing fire on another user, throwing snowballs, etc.

The multi-user media effect may be applied to the original (selecting) user for whom the emotional state was detected and at least one other user. The other user may be, for example, the currently-active user (e.g., the user that is currently speaking or otherwise considered to be most relevant), another user having the same emotional state, a user associated with a portion of the display at which the original user is currently looking (e.g., if the user is staring at another user's video stream and feeling an emotion that triggers a multi-user media effect, the media effect may be targeted at the other user's video stream), or a selected other user.

If the same emotion was detected for multiple users, the same or related media effects may be applied to the users. Alternatively, different media effects associated with the detected emotion may be applied. On the other hand, if different emotional states were detected for different users, different media effects (each associated with one of the detected emotional states) may be applied to the different users.

In some embodiments, the media effects may be automatically applied directly. In other cases, multiple candidate media effects may be identified, and a set of recommended media effects may be automatically presented.

Media effects are not limited to animations. For example, an icon for a third recommended media effect 126-3 allows the user to apply an audio effect to the video stream. The audio effect may include, for instance, adding audio to the stream (e.g., playing an audio track, such as a laugh track or an applause track), modifying audio in the steam (e.g., changing a property of a user's voice, such as the pitch, volume, etc. of the voice), playing a beat that matches a song in the audio stream, etc.

Figure 1F:
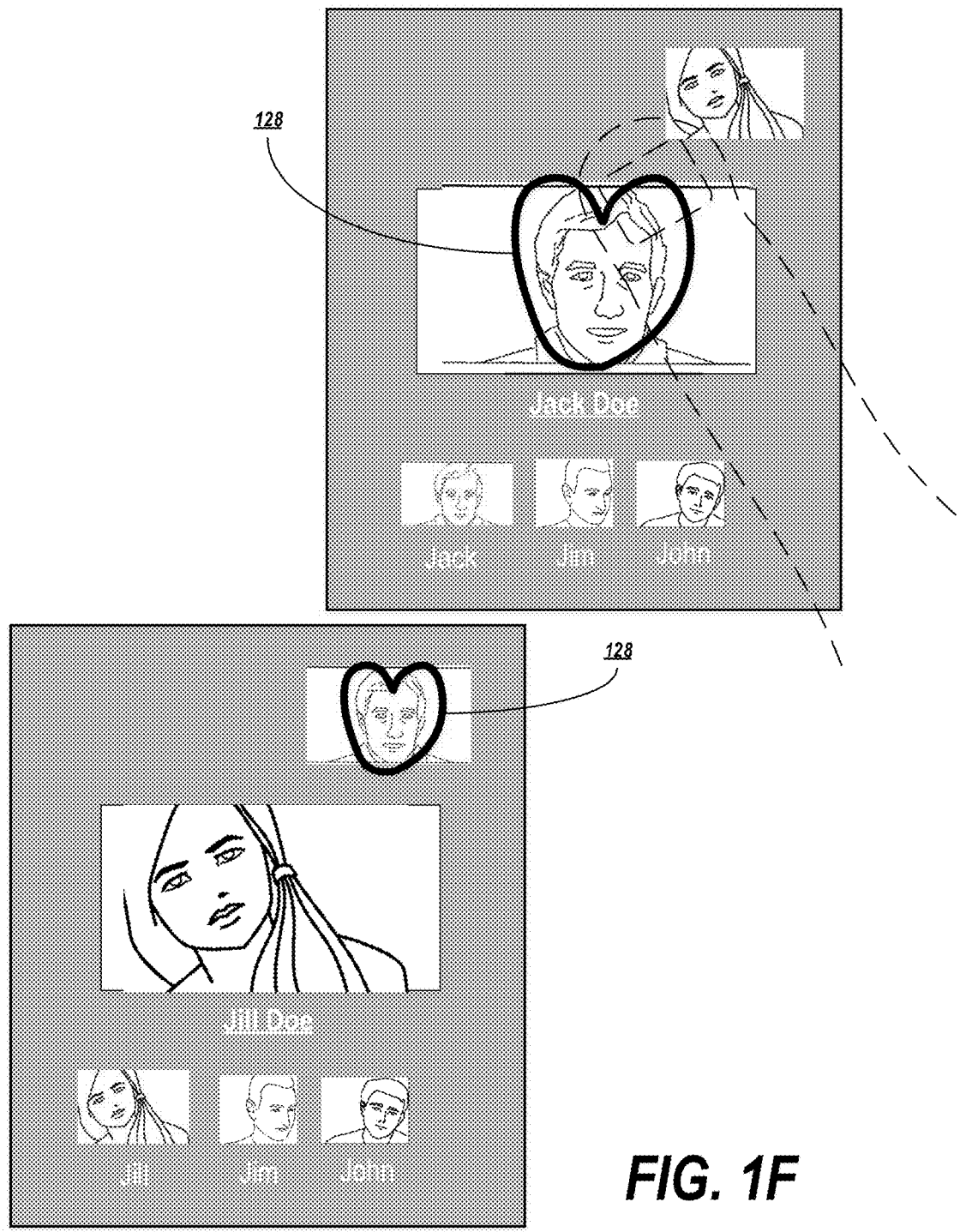
FIG. 1F depicts an example of a drawing applied within a communications interface.

Another type of media effect is a drawing or doodle applied over a display, as shown in FIG. 1F. In this example, a first participant (Jill) interacts with a touch-screen display to draw one or more lines or shapes 128 on the communications interface (in this case, the main window displaying a second participant, Jack). An example of the first participant's display as the user draws the shape is shown in the upper half of FIG. 1F.

Graphics data may be transmitted as a media effect and applied to the displays of other users. The second participant's display is shown in the bottom half of FIG. 1F. In this example, Jack is displayed in the preview window, and the line/shape 128 is drawn in the appropriate location in the preview window.

Other participants would also see the graphic applied over the portion of the display corresponding to the second participant. In other embodiments, any drawn graphics or doodles may be displayed in the main window, regardless of the user currently displayed in the main window.

Figure 1G:
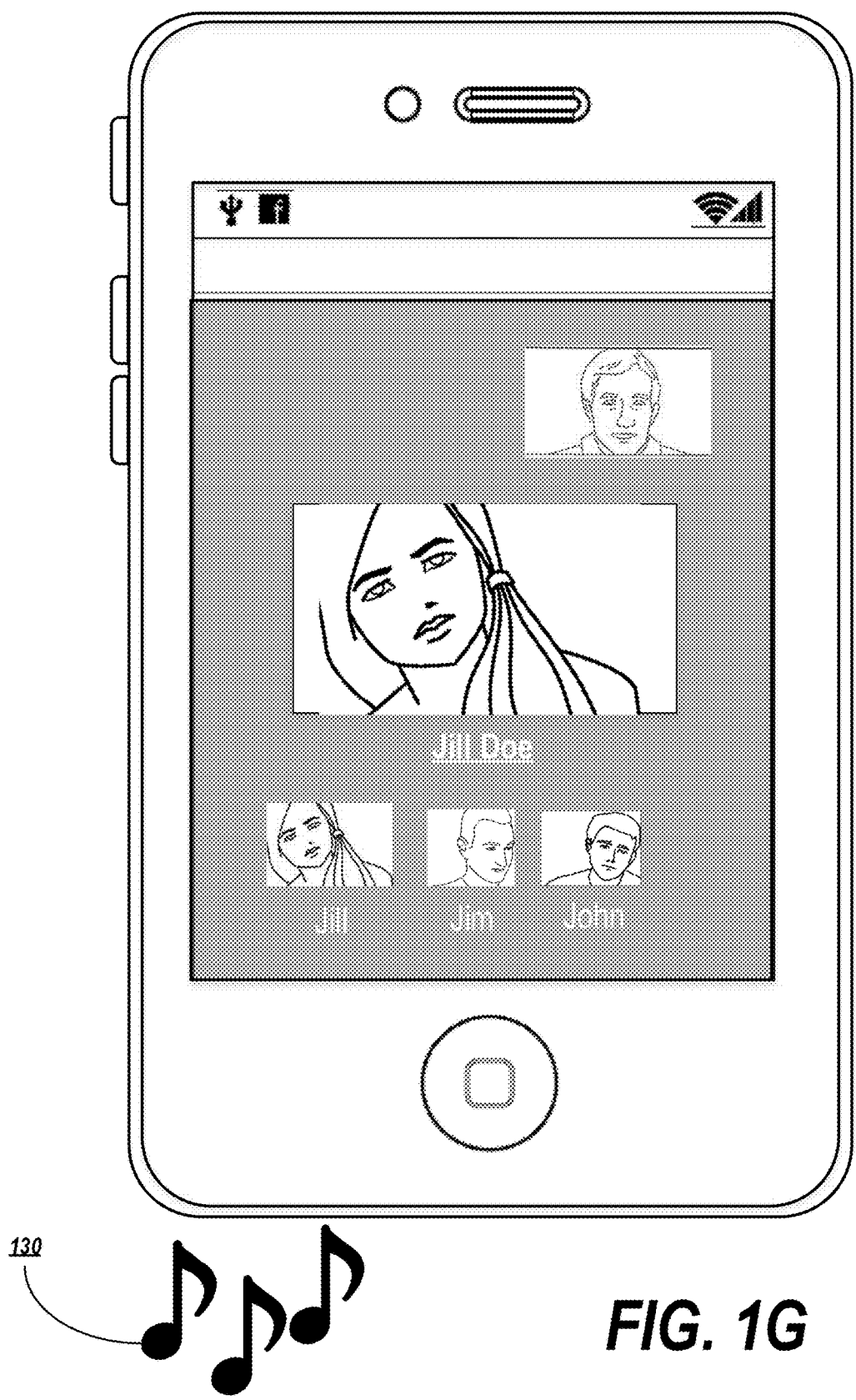
FIG. 1G depicts an example of an audible media effect.

Media effects need not necessarily be graphics. For example, FIG. 1G depicts an example of an audible media effect 130. In this case, triggering the media effect causes a song or recording (or other suitable audio data) to be played on participant's devices.

The above interfaces are intended to be non-limiting examples of applied media effects. Other types of media effects, such as modifying a background, applying a filter, etc. are also contemplated within the scope of the present application.

Figure 2A:
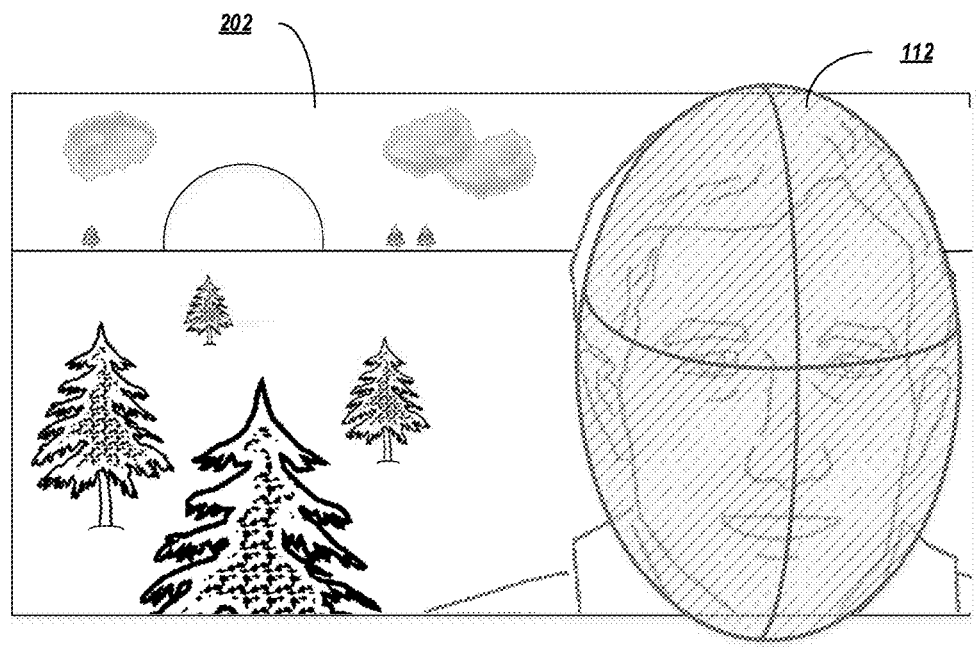
FIG. 2A depicts an exemplary video frame showing a user's face over an original background.
Figure 2B:
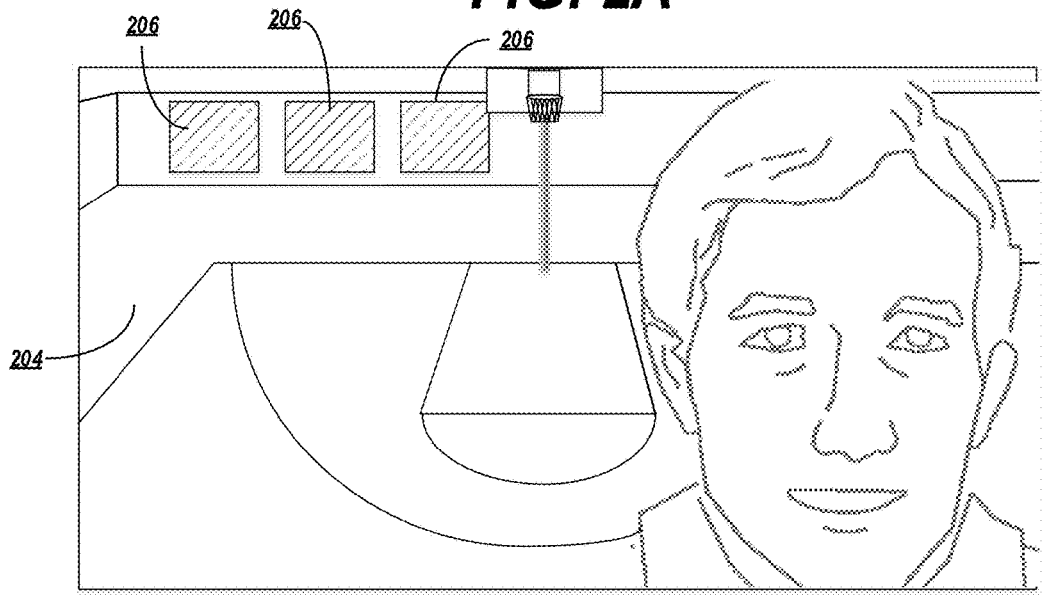
FIG. 2B depicts the video frame of FIG. 2A after the original background has been replaced with a new background.

For instance FIGS. 2A-2B depict an embodiment in which, the background of the video stream is replaced with a new background. In some embodiments, any suitable image segmentation, face detection, or object detection process may be used to achieve the result of replacing an original background with a new background. FIG. 2A depicts an exemplary video frame showing a user's face 112 over an original background 202. By detecting the area belonging to the face 112, the remaining area may be replaced with a new background 204, as shown in FIG. 2B. The new background 204 may be a static image or may be a dynamic video. The new background 204 may be a composite of multiple backgrounds—for example, a background video may show a basketball court, and a further distinct background element may be superimposed on the background video, such as a basketball player. The background element may be personalized to each user (e.g., a Chicago Bulls fan may see Michael Jordan superimposed on the basketball court, while a Boston Celtics fan may see Kevin Garnett superimposed on the basketball court). Information used to personalize the background element may be retrieved from the user's messaging service profile, an associated social networking profile, the video stream or audio stream, etc.

The frame having the new background 204 may be transmitted to the other participants in the video call, or the original frame may be transmitted along with a background or an identifier for a background to be applied at a communications server or at a recipient mobile device.

The new background 204 may include one or more variable content areas 206. The variable content areas 206 may be integrated into the background (e.g., as signs, products being carried in the background, etc.). The variable content areas 206 may be replaced by content which may be selected based on user affinities or characteristics of a participant in the video call (e.g., informational content, targeted promotional material, etc.). In some embodiments, the affinity or characteristic of the user appearing superimposed on the background may determine the content of the variable content areas. In other embodiments, each recipient user may see the variable content areas replaced with content depending on their own characteristics or affinities.

Figure 3A:
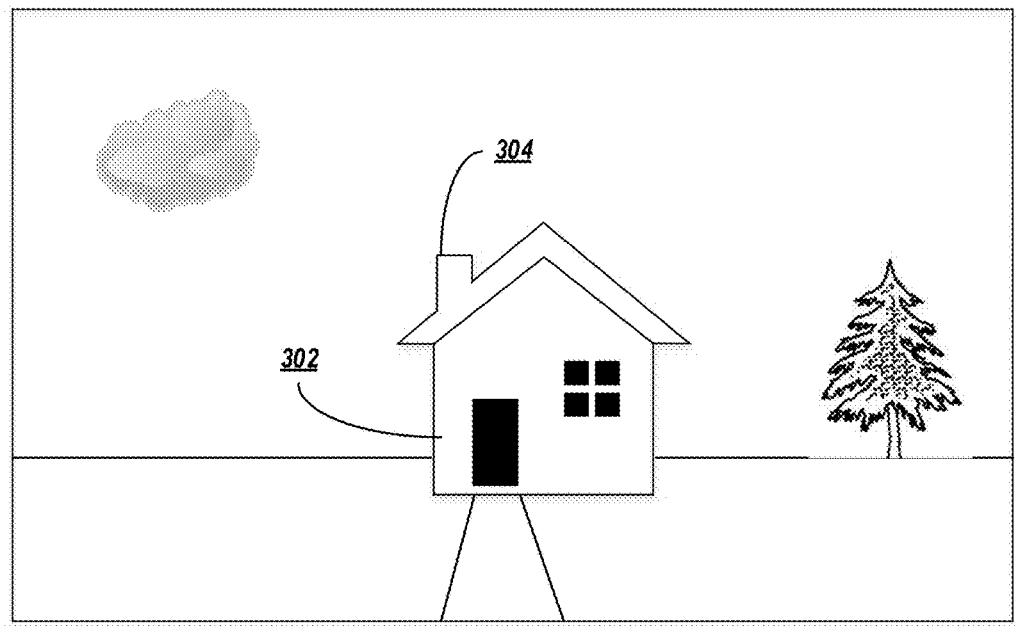
FIG. 3A depicts an exemplary frame from a video stream to which object recognition is applied.

In some embodiments, object recognition may be applied to one or more video frames to identify a context of the video stream. For example, FIG. 3A depicts a frame in which object recognition identifies an object 302 (in this case, a house). Object recognition may also be applied to an identified object 302 to identify parts of the object 304, such as windows (or, in this example, the chimney of the house).

A system may maintain a database, table, or other structure that maps identified objects 302 and/or the parts of objects 304 to media effects. The system may look up any identified objects 302 and/or parts of objects 304 in the structure and retrieve one or more associated media effects. The structure may also store metadata that describes how the media effect may be applied in relation to the object (e.g., size characteristics for the media effect in relation to the object, position characteristics, shape characteristics, rotation characteristics, etc.) More than one media effect may be associated with an object or part of an object. In this case, the system may apply a random effect or may apply an effect based on user preferences, among other possibilities.

Figure 3B:
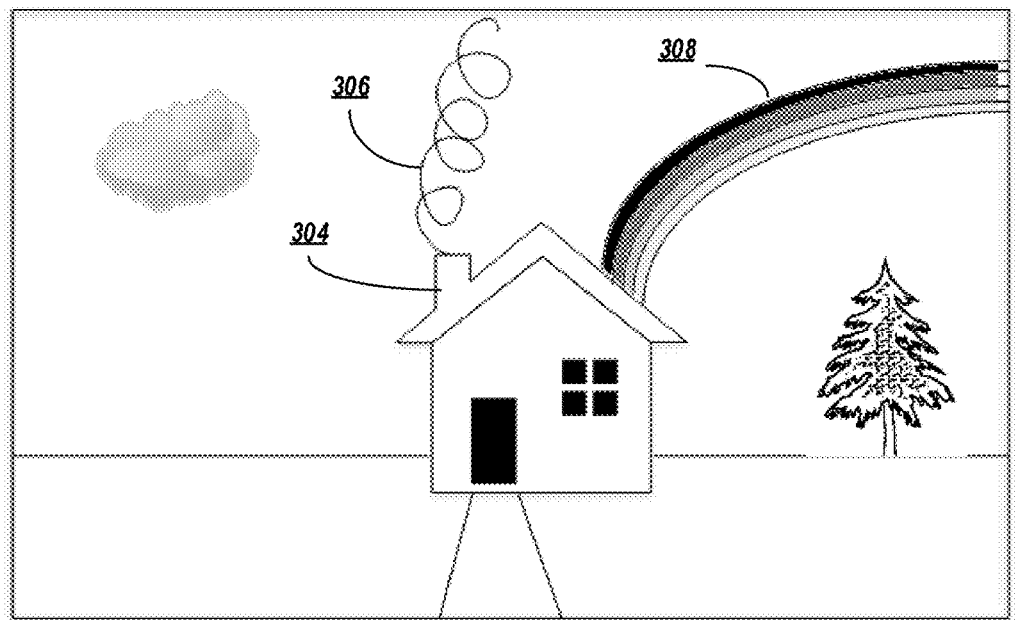
FIG. 3B depicts the frame of FIG. 3A with media effects applied based on the object recognition.

For example, FIG. 3B depicts a frame in which a first media effect 306 is applied to the chimney portion 304 of the recognized house object 302. As part of the object recognition process, the system may identify a position and/or dimensions of the identified object 302 and/or part of the object 304. Using the position and/or dimensions, applied media effects may be positioned, sized, and/or cropped in relation to the identified object 302 and/or the part of the object 304.

For example, the first media effect 306 in this case represents smoke coming out of the chimney portion of the identified house object. The smoke media effect may be retrieved from the structure including the mapping of media effects in relation to the house object and/or chimney object in the structure. The smoke media effect may be positioned in relation to the chimney object and may be sized so that the base of the smoke media effect fills the chimney. The smoke media effect may further be sized and/or cropped so that the smoke appears to rise to the edge of the frame.

Similarly, the house object in the structure may be associated with a second media effect 308. In this example, the second media effect 308 is a rainbow effect that appears to extend from behind the house object to the edge of the frame.

In application the identified objects may obscure portions of the media effects, which (depending e.g. on the stored metadata associated with the media effect and/or object) may appear to pass in front of or behind the identified objects. For example, one or more foreground or background objects 310 may be identified and the media effects may be applied in relation to the foreground or background objects 310.

The preceding represents particular examples in which media effects may be applied. Next, a system for applying or altering media effects is described with reference to FIG. 4.

Exemplary System Configuration

Figure 4:
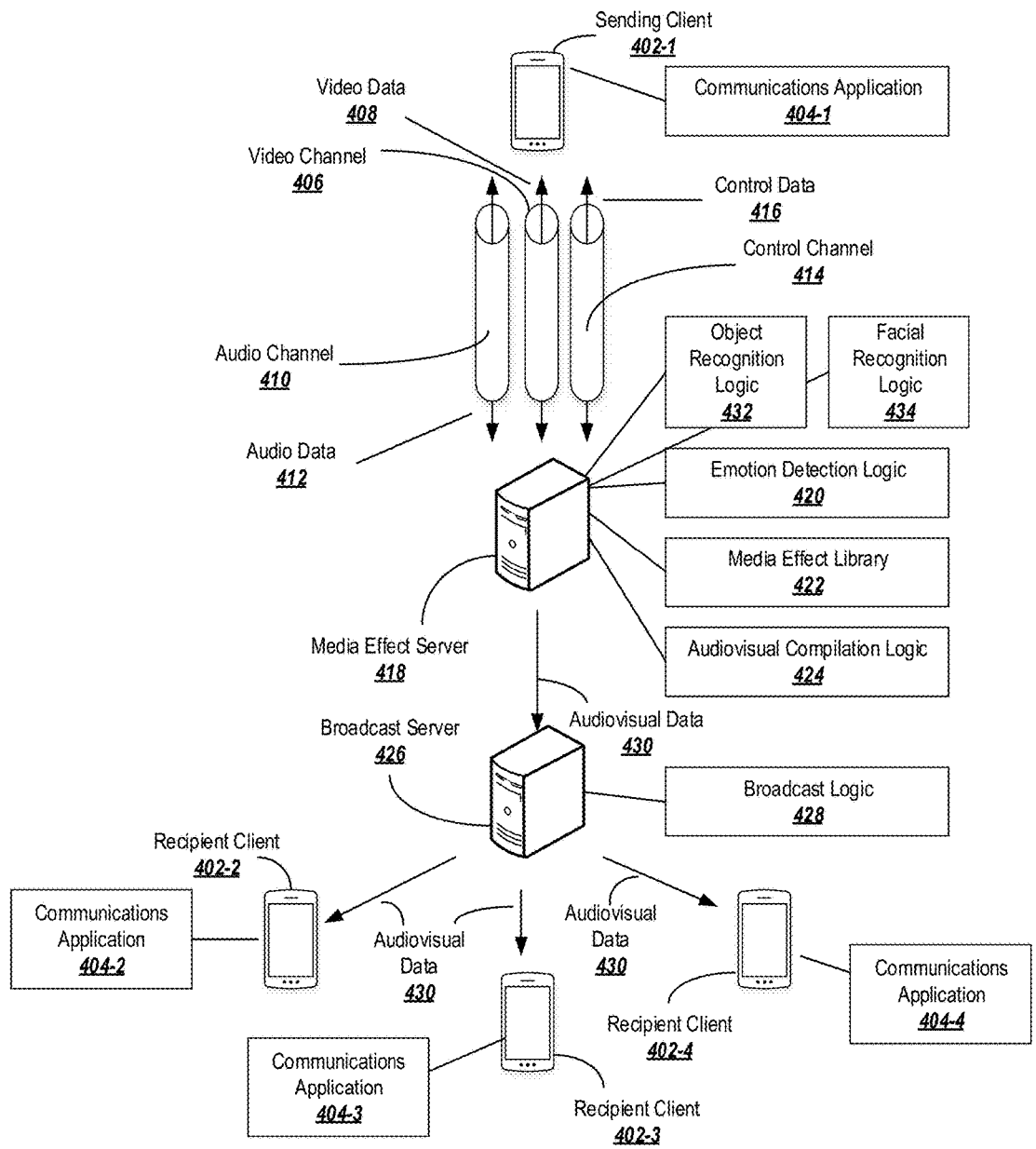
FIG. 4 depicts an exemplary system for recommending and/or applying media effects.

FIG. 4 depicts an exemplary system for recommending and/or applying media effects. The system may facilitate a video communication, which may be (e.g.) a one-to-one, one-to-many, or group communication. Media effects may be applied automatically, manually, or a combination of both.

A sending client 402-1 may be a device associated with a first participant in a communication. The sending client 402-1 may be, for example a mobile device (although the present invention is not limited to application by mobile devices) executing a communications application 404-1 for participating in a video communication with one or more other participants.

The communications application 404-1 may cause information associated with the video communication to be transmitted to one or more servers that facilitate the communication. For example, the information may include video data 408 containing video frames associated with the communication, audio data 412 containing sound information to be synchronized with the graphical frames, and control data 416. The control data 416 may include various instructions, identifiers, metadata, etc. used to apply media effect that are associated with (e.g., synchronized to) the video data 408 and the audio data 412.

Each type of data may be transmitted in an associated channel. For example, the communications application 404-1, or another component of the client 402-1, may open a video channel 406, an audio channel 410, and a control channel 414 with the media effect server 418. The video channel 406 may carry only video data 408 in a video format. Thus, the media effect server 418 may treat any data received on the video channel 406 as data in a video format and may process the data appropriately. Similarly, the audio channel 410 may carry only audio data 412 in an audio format.

The control channel 414 may transmit generic data that is not necessarily in a predetermined format, or may transmit control instructions in a specified control format. For example, the control channel 414 may carry an instruction to analyze the video data 408 and/or audio data 412 for emotional characteristics, or may carry an instruction to apply a media effect. The control channel 414 may be, for example, a Web Real Time Communications (WebRTC) channel.

The video channel 406, audio channel 410, and control channel may carry information in both directions. Thus, for example, the video channel 406 and audio channel 410 may carry data for display/playback on the sending client 402-1

(e.g., data relating to the video streams of one or more recipient clients 402-2, 402-3, 402-4). The control channel 414 may carry recommendations from the media effect server 418, one or more identified emotional states, other instructions, etc.

The media effect server 418 may be configured to analyze the video data 408 and/or audio data 412 using, e.g., emotion detection logic 420 for detecting an emotional state associated with the video data 408 and/or audio data 412, object recognition logic 432 for identifying objects in the video, facial recognition logic 434 for identifying faces in the video, and other types of logic for analyzing the content of the video data 408 and/or the audio data 412. The media effect server 418 may also store a media effect library 422, which includes a number of available media effects and one or more associated emotional states that are paired with the media effects. The media effects may be identified by an identifier, and the media effect library 422 may optionally mirror a media effect library stored locally at the client devices 402. Media effects may be selected from the media effect library 422 at least partially on the basis of the output of the emotion detection logic 420, the object recognition logic 432, and/or the facial recognition logic 434.

The media effect server 418 may further include audiovisual compilation logic 424 for combining the video data 408, the audio data 412, and any applied media effects. The audiovisual compilation logic 424 may include logic for synchronizing the audio data 412 with the video data 408, and further for synchronizing the media effects with the combined audio/video data (or with the audio data 412 or video data 408 individually).

Once combined, the resultant audiovisual data 430 may be transmitted from the media effect server 418 to a broadcast server 426. The broadcast server 426 may include broadcast logic 428 that identifies one or more recipient clients 402-2, 402-3, 402-4 associated with the video communication. The broadcast server 426 may transmit the audiovisual data 430, which includes the audio data 412, the video data 408, and the applied media effects, to each of the recipient clients 402-2, 402-3, 402-4.

Exemplary Data Flow and Logic

Next, exemplary methods, logic flows, and data exchanges are described in connection with FIGS. 5-7.

Figure 5:
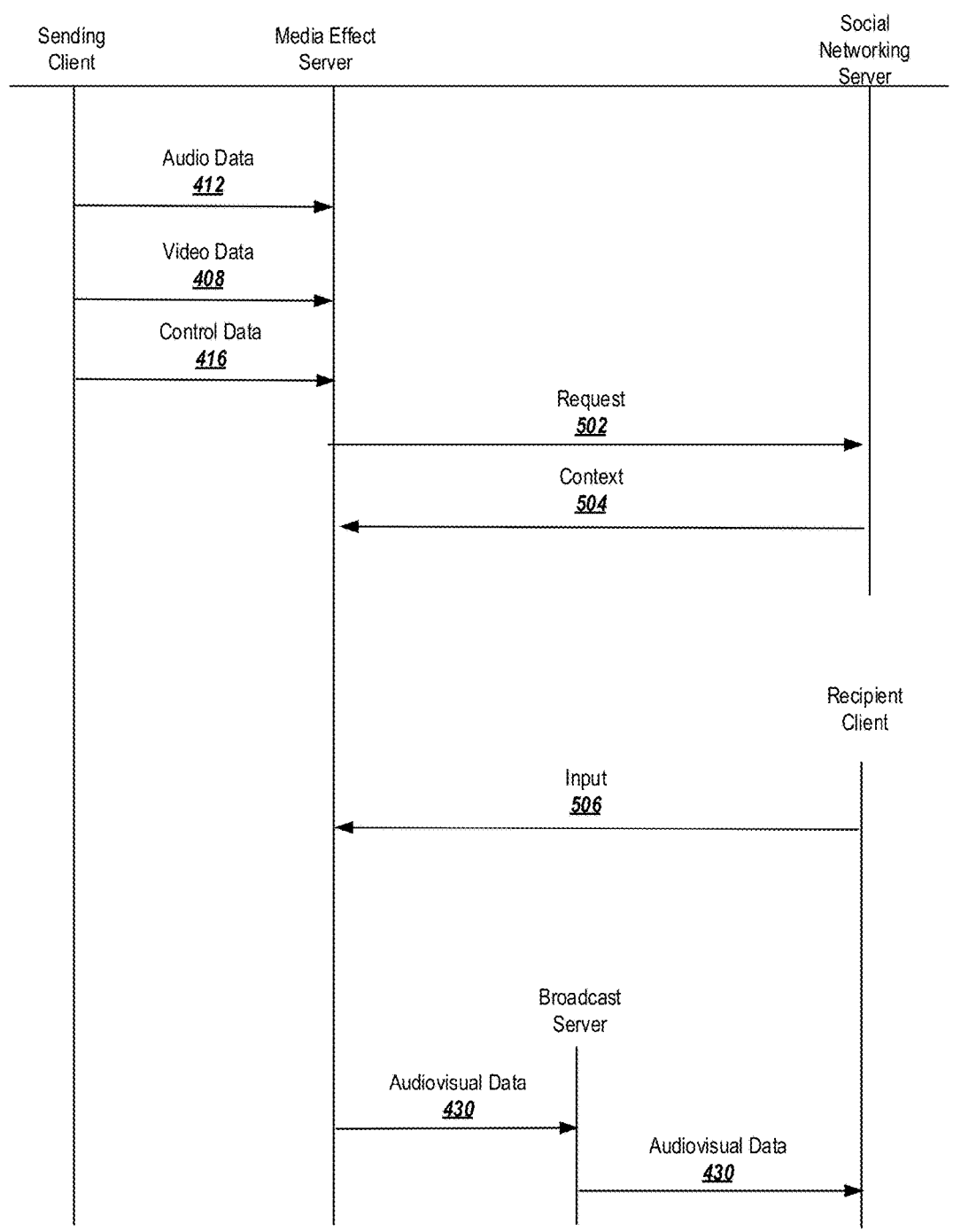
FIG. 5 is a data flow diagram depicting exemplary information exchange when applying and/or altering a media effect.

FIG. 5 is a data flow diagram depicting exemplary information exchange when applying and/or altering a media effect.

As previously described, a sending client may transmit to (a media effect server) audio data 412 on an audio channel, video data 408 on a video channel, and/or control data 416 on a control channel. The audio data 412, video data 408, and control data 416 may relate to a video communication, such as a broadcast or video call.

The control data 416 may include an instruction to apply a media effect. Alternatively or in addition, the media effect server may automatically apply a media effect in the absence of control data 416 and may instruct itself to apply a media effect. In some embodiments, the instruction may originate at the media effect server. For example, the media effect server may track one or more metrics (e.g., viewership numbers, engagement metrics, user interactions, etc.) and may apply the media effect when the metric(s) exceed a threshold. When the metric(s) exceed the threshold, the media effect server may generate the instruction to apply the media effect. The media effect may then be automatically applied (e.g., subject to cancellation from the broadcaster), or could be made available to the broadcaster for manual application.

The instruction, whether originating at the sending client or the media effect server, may identify one or more participants to whom the media effect should be applied, which may or may not include the participant associated with the sending client.

Upon identifying that a media effect is about to be or has been applied to the video communication, the media effect server may transmit a request 502 to a social networking server, a third-party information source, or another source capable of supplying context information. The media effect server and the contextual information source may be part of the same device. Context information may describe an environment, temporal characteristics, recent or ongoing events, engagement with the video (e.g., interactions such as liking the video, commenting on the video, sharing the video etc.) or other circumstances relating to the video communication and/or participants in the video communication. In this example, the media effect server transmits the request 502 to a social networking server, although more and/or different context sources may be used.

The request 502 may identify specific pieces of data requested (e.g., the participants' birthdays, anniversaries, etc.) or may request any contextual information that the context source is authorized to release and/or deems to be relevant.

In response to the request 502, the context source may gather and transmit context information 504. The context information 504 may include information responsive to the request 502 and/or any other information the context source is authorized to transmit and/or deems to be relevant.

Alternatively, the media effect server may transmit a request 502 for the context without identifying that a media effect application is imminent or ongoing. For example, the media effect server may request the context on a regular, ongoing basis (e.g., at predetermined intervals or upon the occurrence of predetermined events, such as events that indicate that a media effect application instruction may be forthcoming). In another embodiment, the social networking server or other context source may provide the context 504 unprompted (e.g., at regular intervals).

Having received the context information 504, the media effect server may apply and/or modify a media effect to the video communication. The media effect may be applied to the audio data 412 and/or video data 408, or may be independent of the audio data 412 and/or the video data 408. The media effect may be specified by the control data 416, but may be modified based on the context 504.

Alternatively or in addition, one or more recipient clients may provide input 506 related to the video communication. The input 506 may be explicit, such as when a user submits a comment on a video, "likes" a video, clicks on or gestures in relation to a portion of a display showing the video, sings along to a video, provides voice instruction to the video, or otherwise expressly engages with or interacts with the video. The input 506 may also be implicit, such as by indicating that the recipient client's device is currently accessing the video (e.g., providing a viewership number).

Input 506 received from multiple recipient clients and may be compared to each other and/or aggregated together. For example, viewership numbers, comments, likes, etc. may be accumulated, clicks or gestures may be translated into vectors which may be added together, different audio inputs may be compared to the audio data 412 of the original sending client or another client (and/or to the other audio inputs from other recipient clients), etc.

Based on the aggregated inputs, the media effect server may generate and/or modify one or more media effects. For example, media effects may be stretched based on accumulated input vectors, different backgrounds may be applied or may be animated in different ways, graphical or audible objects may be inserted into the video stream, an animation may be made more or less elaborate, or other steps may be taken to apply or modify a media effect.

Although not depicted in FIG. 5, it is contemplated that the recipient client may have already received (and/or may be receiving on a continuous basis) audiovisual data related to the video communication. Accordingly, the recipient client may provide the input 506 in view of the previously-received audiovisual data, although no receipt of previous audiovisual data (before the input 506) is explicitly shown in FIG. 5.

The media effect server may combine the audio data 412, the video data 408, and the media effect (as modified based on the context 504 and/or the aggregated inputs 506) into audiovisual data 430. The audiovisual data 430 may be provided to a broadcast server, which then distributes the audiovisual data 430 to any recipient clients flagged to receive the broadcast.

Figure 6:
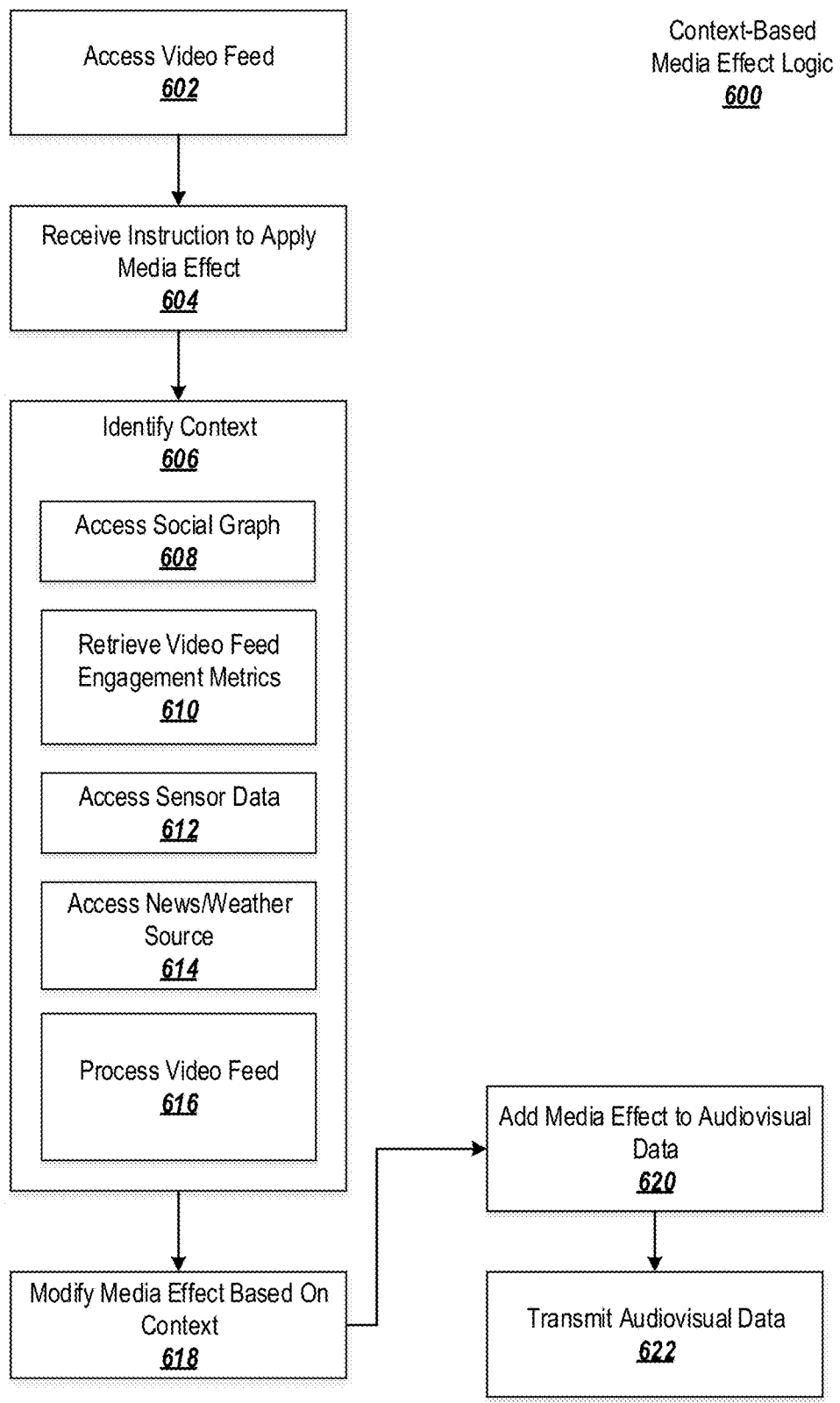
FIG. 6 is a flowchart depicting exemplary logic for applying context-sensitive media effects.

Turning to FIG. 6, a flowchart depicting exemplary logic 600 for applying context-sensitive media effects is depicted.

At block 602, a system (such as a media effect server, a client device, or a communication server facilitating a video call or broadcast) may access a video stream. For example, the system may receive one or more frames associated with a video call or broadcast, such as when a video call application operating on a client mobile device receives one or more video frames from a camera of the mobile device or the frames are forwarded to a media effect server. The frames may include audio data received on an audio channel and/or video data received on a video channel.

At block 604, the system may receive an instruction to apply a media effect. The instruction may be an explicit instruction, such as when an instruction is received by the media effect server on the control channel. When performed locally at a client device, the instruction may be received as an input from a user (e.g., by interacting with a touch display or issuing a voice instruction).

The instruction may also be an implicit instruction, such as when a media effect server and/or local client analyzes emotion data and applies a media effect in accordance with the analysis (e.g., without an express instruction to apply the media effect). In some embodiments, the media effect server may automatically apply a media effect under a given set of circumstances, unless canceled. For example, upon detecting an emotional characteristic in a participant, the system may automatically apply a media effect associated with that emotional characteristic, unless the user executes a cancellation instruction/gesture. In another example, a media effect may be automatically applied when a new user joins a communication or begins viewing a broadcast. In yet another example, the system may automatically apply an audio media effect upon the occurrence of an event (e.g., adding a laugh track in response to a detected joke, a clapping track after an event, or a "wah-wah" trombone sound after detecting disappointment or another emotion in a group of the participants. The automatic application of the media effect and/or the lack of a cancellation request may be treated as an implicit instruction to apply the media effect.

Alternatively, or in addition, media effects may be automatically suggested for acceptance or denial. For example, a prompt to apply a media effect may be automatically presented, and the user may determine whether to accept or deny the media effect.

Alternatively or in addition, a media effect may be applied when certain conditions as reported by one or more context sources (as described in connection with block 606) are met. For example, if a fitness sensor reports that a user has recently participated in a workout, the system may treat the meeting of this condition as an implicit instruction to apply a media effect. In this case, the user might be shown with bulging animated muscles and/or animated sweat, or an audio effect might play to indicate a cheering crowd when the user enters the video communication.

At block 606, the system may identify a context associated with the media effect, the video stream, and/or participants in the video stream (or their client devices). The context may represent meta-information about the media effect, video-stream, etc. that describes an environment in which the video stream is taking place, a level or degree of engagement with the video stream or a participant in the video stream, attributes or characteristics of the participants or viewers, recognized objects or people in the video stream, or other information about the circumstances in which the video stream or participants in/viewers of the video stream exist.

The context identified at block 606 may relate to the user to whom the media effect identified at block 604 is to be applied. Alternatively or in addition, the context identified at block 606 may pertain to one or more participants in the video stream or viewers of the video stream that are not the same as the user to whom the media effect identified at block 604 is to be applied. In other words, the system may receive an instruction to apply a media effect to User A and may retrieve context information relating to a distinct User B and/or User C. The information about the other user(s) may be used to alter the media effect to be applied to User A.

In some contexts, users may be permitted to apply and/or modify media effects of other users. More specifically, a first user may select a media effect that is applied to a second user. For instance, a personal trainer may run a video-based personal training class. During the class, the personal trainer may be permitted to apply media effects to their students (e.g., extra-large muscles for a participant that is performing exceptionally well).

In embodiments where alternate-user effect application is enabled, each user may be permitted to define how and when media effects may be applied to them. For example, a user may identify which media effects may be applied to them, under what circumstances the media effects may be applied, who may apply the media effects (e.g., only friends, only a specified group of friends, etc.).

Identifying the context at block 606 may involve consulting one or more context sources. For example, at block 608, the system may access a social graph of a social networking service to identifying information about the video stream and/or participants/viewers of the video stream. Social graph information may include, but is not limited to, information about the participants or viewers of the video stream, including: dates such as birthdates, anniversaries, dates of significant events; likes and dislikes such as favorite/least favorite sports teams, TV shows, or movies; friends, acquaintances, and relatives; and social network events such as becoming friends with a new person or participating in their first video communication or live broadcast, among other possibilities. Further social graph information may include, but is not limited to, information about the video stream, including an originator of the video stream, a number or content of comments on the video stream, and other possibilities.

In one social-network-based example, instruction received at block 604 may be in response to a new user joining the video stream (e.g., the video stream is a live broadcast and the new user joins in to watch the broadcast). At block 608, the system may access the social graph of each current participant/viewer in the video stream (e.g., accessing the social graph of the other viewers of the live broadcast) to determine how close each of the current participants/viewers are to the new participant/viewer. For example, the system may access one or more affinity scores maintained by the social network, where the affinity scores quantify or qualify a relationship between the two users. If the affinity scores are above a predetermined threshold, the system may determine that the users are sufficiently well-acquainted to inform the users of their mutual presence and/or surface shared experiences. For example, the system may present a message to the new user and/or the current user to indicate that the other user is present (e.g., "<new user> has just joined the broadcast!" or "<current user> is also watching this broadcast!"). The system may further may further retrieve particularly significant (as determined by engagement levels of the two users or of other users) photographs that include both of the users, or other shared social media content, and may surface them to the user that just recently joined and/or the current user. The photographs may be presented in a short slideshow.

In the broadcast viewer context, such an embodiment gives a stronger sense of shared viewership, reinforcing that two viewers are watching the broadcast together. This may increase a sense of shared experience, such as when the broadcast is of a sporting event or other activity that might traditionally be (or might benefit from being) watched in a communal, social setting.

Still further, such an embodiment may ease the sharing of information. For example, upon displaying the slideshow, the system may present an option to share one or more of the photographs with the rest of the viewers of the video.

Turning to block 610, the system may retrieve video stream engagement metrics from one or more sources. The video stream engagement metrics may come from a social graph, as described above in connection with block 608, and/or may come from a communications server such as a messaging server, a media effect server, a broadcast server, a client device, or some other engagement metric source. The engagement metrics may include, but are not limited to, a number of viewers or participants in the video stream, a number of times the video stream has been interacted with (e.g., "liked" or "shared" in a social network, commented upon, reacted to), etc.

At block 612, the system may access sensor data relating to the video stream and/or one or more participants in the video stream. The sensor data may be provided by any number of sensors, such as a wearable sensor associated with a user (e.g., a fitness tracker, a heart rate monitor, etc.), a sensor on the user's mobile device (e.g., a camera, a microphone, a GPS sensor, an accelerometer, etc.), a sensor in the user's home or work (e.g., temperature sensors, humidity sensors, light sensors, security sensors, Internet of Things sensors, control modules, etc.), or any other suitable type of sensor compatible with or configured to communicate with the relevant system/server.

In on example, the video stream may be a broadcast of a famous singer who is singing live from a stage. The broadcast may be viewed by many viewers (e.g., in the millions). While viewing the broadcast, some of the viewers may attempt to sing along with the singer. The singing may be picked up by a local microphone on the viewer's local device. The system may determine which of the viewers who is singing along is the most on-pitch (or may apply other metrics), and may activate (with the viewer's permission) the viewer's camera to capture video data of the viewer singing or dancing. The system may then animate the viewer into the broadcast alongside the singer, which may be shown to the other participants of the broadcast.

In another example, the system may analyze sensor data and pop up media effects based on a projected intent. For example, if multiple users are discussing where to go for lunch in a video chat, the system may consult check-in data from the users to determine favorite restaurants, may compare the favorites to determine a consensus pick, may evaluate restaurant wait times and distances to the restaurants, and may pop up a media effect with a suggestion as to which restaurant to go to. Moreover, the system may suggest transportation options, such as by popping up an interactable media effect for summoning a car service.

At block 614, the system may access an information source, such as a news or weather source, which may be associated with the system or which may be a third-party source. The system may use the information from the source, such as the current weather where a participant is located, a current event, etc. to modify or apply the media effect. For instance, the system may retrieve the local weather conditions, and may apply weather-related effects (e.g., animated fog, lightning strikes, rainbows, etc.) to the video stream.

At block 616, the system may process the video stream itself to identify context. Processing the video stream may involve performing object recognition on the video stream to identify known objects/parts of objects in the stream, performing biometric analysis to identify particular people in the video stream, or examining the video stream for audio triggers or video triggers, among other possibilities.

The audio triggers and video triggers may involve particular patterns in the audio data in the audio channel or video data in the video channel, respectively, that trigger a media effect application or the modification of a media effect. For example, if a user is detected to be running on a track based on audio and/or video data (potentially in combination with sensor data from block 612), the system may animate a crowd of users in the background and play a cheering audio effect.

Any combination of the context sources described in connection with block 606 may be utilized. Moreover, other types of context sources not expressly described may also be within the scope of the invention.

At block 618, the system may modify the selected media effect based on the context identified at block 606. One or more rules may be defined for particular contexts, and based on the context identified at block 606, the rules may be applied. Alternatively or in addition, the media effects stored in the media effect library may be associated with modification conditions which define the particular contexts in which the media effects may be modified (and how the media effects are modified).

For example, there may be a rule for "fitness" contexts, which may be triggered based on sensor data, processing of the audio stream, social network information (e.g., the user checking in recently at a local gym), or other fitness-related circumstances. When the fitness rule is triggered, a set of media effects may be identified for application or modification.

In another example, the system may determine to apply a media effect (e.g., animating new clothes on the user) and may retrieve the media effects from the media effect library. The media effect library may define contexts in which the media effect to be applied may be modified. The system may consult the context sources to determine if any of the contexts currently apply. If so, the media effect may be modified as defined in the library.

At block 620, the system may add the media effect to the audiovisual data of the video stream. For example, the system may access video data on the video channel and audio data on the audio channel, incorporate the media effect into the audio and/or video data, and synchronize the data for transmission to the broadcasting server. At block 622, the system may transmit the resulting modified audiovisual data towards its destination (e.g., to receiving client devices or a broadcast server).

Turning now to FIG. 7, a flowchart depicting exemplary logic 700 for aggregating inputs to alter a media effect is depicted.

At block 702, the system may access a video stream and at block 704 may receive and instruction to apply a media effect to the video stream. These procedures are similar to those performed in blocks 602 and 604 in FIG. 6, and further description is omitted here for the sake of brevity.

At block 706, the system may receive an input from one or more participants in the video stream. The input may be actively provided (e.g., by accumulating express interactions with a touch screen or input device) or may be passively provided (e.g., by accumulating viewership numbers, a number of emotional responses of different types, etc.). The input may be provided by a sensor, such as a tap on a touchscreen, interaction with a display element (e.g., a voting button for a poll), etc. The input may be a text input provided by a keyboard, an audio input provided to a microphone, a gesture on a touchscreen, etc.

In some cases, the input may be associated with an input vector (e.g., the user may apply a swiping gesture that starts at a first location on a touch display and proceeds to a second location; the difference between the first location and the second location may define direction and magnitude values for the vector).

The input may also be provided from an information source, such as a social network's social graph or a broadcast server. For example, the input may be a number of viewers of the current video stream, or a level of engagement with the video stream (e.g., number of likes, shares, comments, etc.).

The input may be associated with an object in the video feed (e.g., a house, a cloud, etc.), which may be recognized using object recognition. In some cases, interactible objects may be visually distinguished from non-interactible objects (e.g., by providing a glow effect, changing the colors, outlining, etc.). Thus, video communication participants may be informed of which objects are capable of interaction. In other cases, certain recognized objects may remain hidden (e.g., with nothing to visually distinguish them from other objects). Users may discover hidden interactibe objects through trial-and-error, etc.

In some embodiments, interactible objects may be objects that are capable of having a media effect applied to them (e.g., a cloud object may have an associated lightning-strike media effect). In other embodiments, interactible objects need not necessarily be objects having an associated media effect, but interactions with these objects may trigger a media effect in other objects (e.g., interacting with a cloud may cause an animated flower to bloom).

At block 708, the inputs may be aggregated together to generate an aggregated input. For example, in the case of an input value (such as number of taps on a screen) or votes in a poll, the input values may be added or subtracted together. In the case of an input having an associated vector, the vectors may be added together to generate a cumulative vector. Some inputs may be associated with options (e.g., a broadcaster walking down the street may initiate a poll asking viewers whether they should turn left or turn right; each possibility may be assigned a button and votes may be accumulated for each possibility). The different options may be aggregated separately and then the resulting aggregated inputs may be compared to determine a consensus choice.

In order to aggregate the inputs, the inputs may be weighted based on weights, which may be predetermined static weights, or which may vary depending on the media effect to be applied. For example, certain highly interactive user behaviors (e.g., a gesture) may be weighted more than other user behaviors (such as liking or sharing the video stream). By using interactions having increased weights, higher levels of interaction or media effect tiers may be achieved faster. Thus, by defining the weights available to different types of interactions, a communication service may encourage or incentivize certain types of behaviors. Still further, some objects may remain hidden until certain conditions occur (e.g., if the user taps near the object, within a predetermined vicinity, or until a certain amount of time passes without any users tapping on the object, etc.).

If the input received at block 706 is received from a single participant, multiple inputs from the participant may be aggregated together (e.g., if the user taps a touch screen multiple times, then each tap may register as a single input which may be accumulated to determine a total number or rate of taps). If the input received at block 706 is received from multiple participants, then each input from each participant may be treated as a single input or multiple inputs that may be aggregated together. For example, multiple users may tap their respective touch screens, in which case each tap may register as an input, which may be aggregated at a user level and then aggregated again over all the viewers of the video stream. In some circumstances, however, it may be desirable to treat multiple inputs from a single user as a single input—thus allowing each user to provide a single "vote." In another example, it may be desirable that each user may contribute only a single view to aggregate viewership numbers.

At block 710, the system may optionally determine whether the aggregated input is above a predetermined threshold. In some embodiments, media effects are only modified if the level of the input (e.g., engagement, viewership, poll results, etc.) exceeds a predetermined amount. This may prevent the system from applying modifications in view of only minimal input.

Alternatively or in addition, multiple thresholds may be used (e.g., to define a low, medium, and high effect). The media effect may be associated with a number of different tiers of modifications that are linked to respective thresholds. For instance, a broadcaster may apply a lei media effect to themselves. The lei may start off as a basic necklace with a few basic flowers. As the broadcaster receives more and more views, the lei may become more elaborate. For example, at a first threshold number of viewers, the lei may be upgraded to a tier 2 media effect having more flowers. At a second threshold number of viewers, the lei may be upgraded to a tier 3 media effect having more types or more elaborate flowers. This may continue through any number of tiers and thresholds.

If the determination at block 710 is "No" (i.e., the aggregated input is not above the predetermined threshold), then processing may proceed to block 712. At block 712, the system may apply the original (unmodified) media effect to the audiovisual data (e.g., the system may ignore the input aggregated at block 708), and at block 714 may transmit the audiovisual data towards its destination. These procedures are similar to those performed in blocks 620 and 622 of FIG. 6, and further description is omitted here for the sake of brevity.

If, on the other hand, the determination at block 710 is "Yes" (i.e., the aggregated input is above the predetermined threshold), then processing may proceed to block 716. At block 716, the media effect may be modified based on the aggregated input. The media effect library may define modifications to the media effect that may be applied based on the aggregated input. For example, if the media effect is a mask graphic applied to a participant's face, the inputs might involve other users pushing or pulling on the mask, thus generating input vectors for different locations on the mask. Each input location may have its associated input vectors aggregated, and the mask may be pushed, pulled, or otherwise distorted at the various locations based on the aggregated input vectors. In another example, the inputs may be poll results, and an action may be taken based on the poll option that receives the most votes (e.g., instructing the broadcaster to turn left or turn right). In yet another example, a broadcaster may be running along an animated track, and the inputs may be taps on various viewers' touch displays. Depending on the number or rate of taps, the user may be animated as running faster or slower on the track.

In some embodiments, the media effect may be applied or modified without confirmation or agreement from the broadcaster. For example, the broadcaster may be animated walking through a city, where the audience is allowed to vote on the next animated location that the broadcaster is required to go. The broadcaster may take actions to sway the votes of audience, but once the audience votes, the broadcast changes to reflect the will of the viewers without the consent of the broadcaster; the animated city may change automatically. In another example, portions of the city may be unlocked as the broadcast receives more and more views.

As a result, the broadcaster may take actions to influence the audience (e.g., to influence their votes in a poll or to unlock more elaborate media effects), which may result in a broadcast that is more interesting to the audience. The increased audience participation may then grant the broadcaster more elaborate media effects, which in turn increase the broadcaster's incentive to further influence the audience. This feedback loop may result in higher-quality broadcasts that are of interest to a wider swath of potential viewers, and may increase user-base engagement with video streams.

At block 718, the system may apply the modified media effect to the audiovisual data, and at block 714 may transmit the modified audiovisual data towards its destination. These procedures are similar to those performed in blocks 620 and 622 of FIG. 6, and further description is omitted here for the sake of brevity.

Messaging System Overview.

Figure 8B:
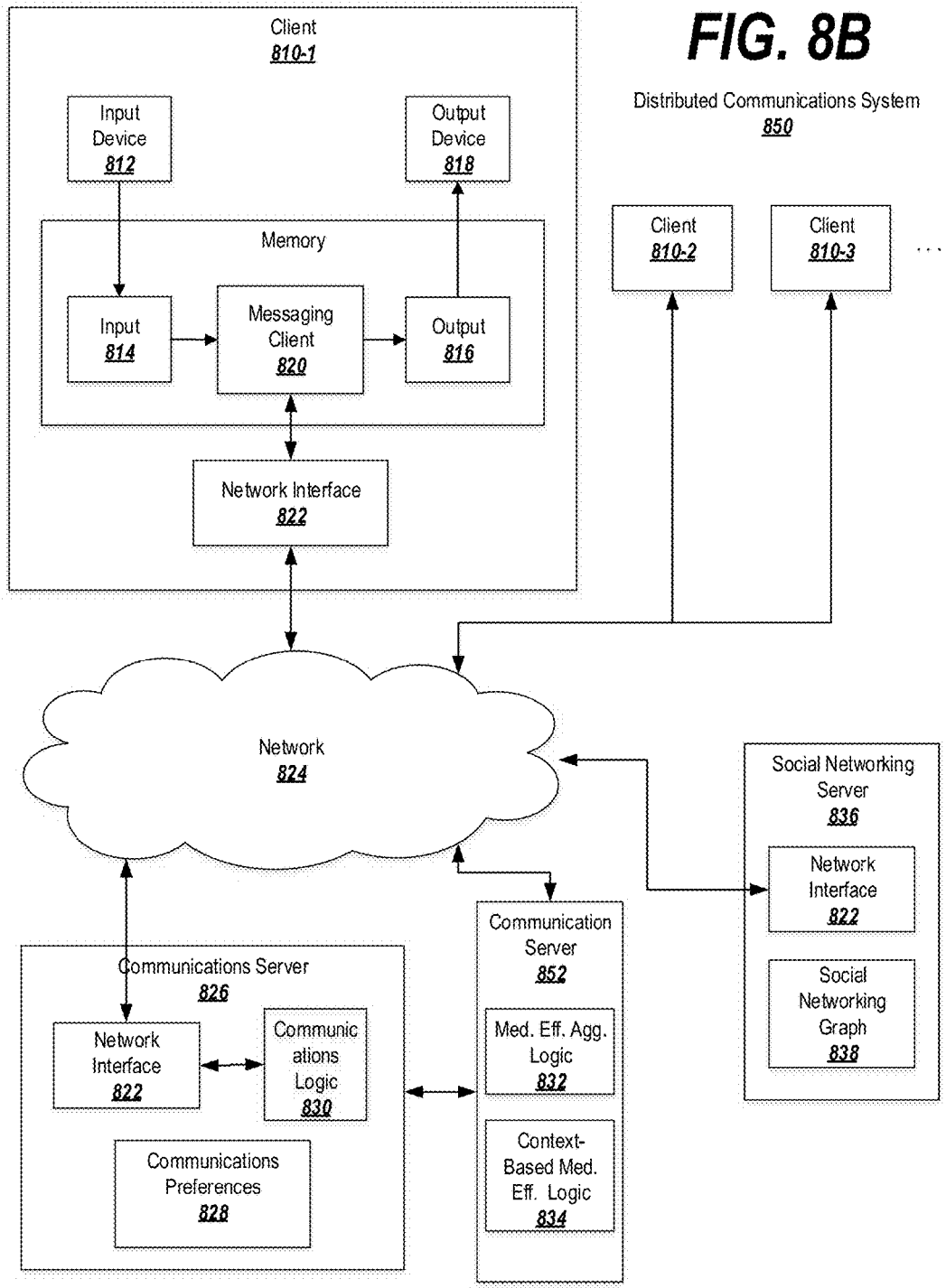
FIG. 8B is a block diagram providing an overview of a system including an exemplary distributed communications service.
Figure 8C:
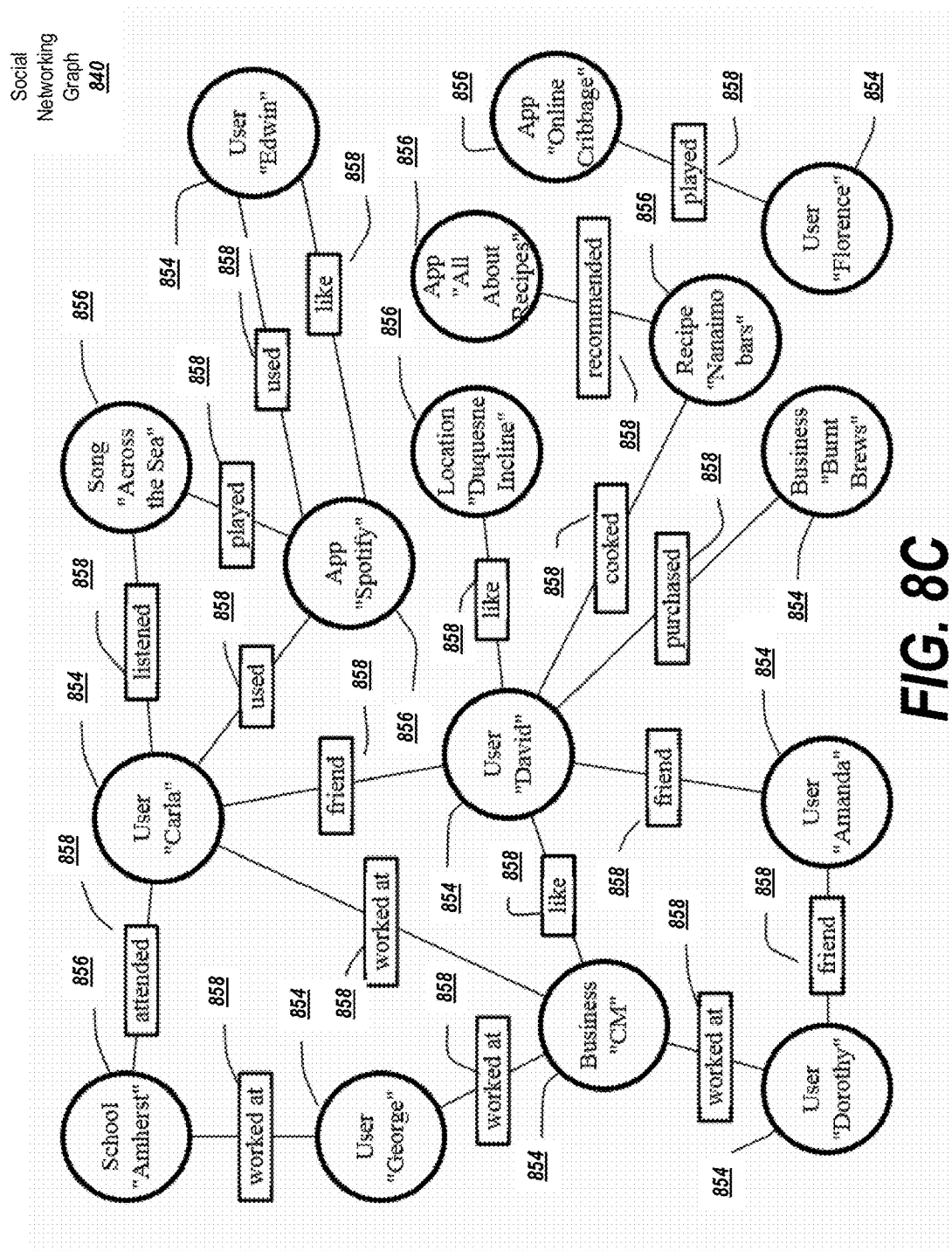
FIG. 8C depicts the social networking graph of FIGS. 8A-8B in more detail.

These examples may be implemented by a video communications system that is provided locally, at a client device, or remotely (e.g., at a remote server), or some combination thereof. FIGS. 8A-8C depict various examples of communications systems, and are discussed in more detail below.

FIG. 8A depicts an exemplary centralized communications system 800, which facilitates video communications between two or more users. The centralized system 800 may implement some or all of the structure and/or operations of a messaging service in a single computing entity, such as entirely within a single centralized server device 826.

The communications system 800 may include a computer-implemented system having software applications that include one or more components. Although the messaging system 800 shown in FIG. 8A has a limited number of elements in a certain topology, the messaging system 800 may include more or fewer elements in alternate topologies.

A communications service 800 may be generally arranged to receive, store, and deliver video communications.

A client device 810 may transmit video communications addressed to one or more recipient users, user accounts, or other identifiers resolving to receiving client devices 810. In exemplary embodiments, each of the client devices 810 and their respective clients 820 are associated with a particular user or users of the communications service 800. In some embodiments, the client devices 810 may be cellular devices such as smartphones and may be identified to the communications service 800 based on a phone number associated with each of the client devices 810. In some embodiments, each client may be associated with a user account registered with the communications service 800. In general, each client may be addressed through various techniques for the reception of video communications. While in some embodiments the client devices 810 may be cellular devices, in other embodiments one or more of the client devices 810 may be personal computers, tablet devices, any other form of computing device.

The client 810 may include one or more input devices 812 and one or more output devices 818. The input devices 812 may include, for example, microphones, keyboards, cameras, electronic pens, touch screens, and other devices for receiving inputs including message data, requests, commands, user interface interactions, selections, and other types of input. The output devices 818 may include a speaker, a display device such as a monitor or touch screen, and other devices for presenting an interface to the communications system 800.

The client 810 may include a memory, which may be a non-transitory computer readable storage medium, such as one or a combination of a hard drive, solid state drive, flash storage, read only memory, or random access memory. The memory may a representation of an input 814 and/or a representation of an output 816, as well as one or more applications. For example, the memory may store a messaging client 820 and/or a social networking client that allows a user to interact with a social networking service.

The input 814 may be textual, such as in the case where the input device 812 is a keyboard. Alternatively, the input 814 may be an audio or video recording, such as in the case where the input device 812 is a microphone or camera.

The input 814 may be subjected to automatic speech recognition (ASR) logic in order to transform the audio recording to text that is processable by the messaging system 800. The ASR logic may be located at the client device 810 (so that the audio recording is processed locally by the client 810 and corresponding text is transmitted to the communications server 826), or may be located remotely at the communications server 826 (in which case, the audio recording may be transmitted to the communications server 826 and the communications server 826 may process the audio into text). Other combinations are also possible—for example, if the input device 812 is a touch pad or electronic pen, the input 814 may be in the form of handwriting, which may be subjected to handwriting or optical character recognition analysis logic in order to transform the input 812 into processable text.

The client 810 may be provided with a network interface 822 for communicating with a network 824, such as the Internet. The network interface 822 may transmit the input 812 in a format and/or using a protocol compatible with the network 824 and may receive a corresponding output 816 from the network 824.

The network interface 822 may communicate through the network 824 to a messaging server 826. The messaging server 826 may be operative to receive, store, and forward messages between messaging clients.

The communications server 826 may include a network interface 822, communications preferences 828, and communications logic 830. The communications preferences 828 may include one or more privacy settings for one or more users and/or video communications. For example, the communications preferences 828 may include one or more settings, including default settings, for the logic described herein.

The communications logic 830 may include media effect aggregation logic 832 for modifying media effects based on aggregated input, as described above. The communications logic 830 may further include context-based media effect logic 834 for applying or modifying media effects based on a context, as further described above (the logic 832, 834 may also or alternatively be provided on the clients 810).

The network interface 822 of the client 810 and/or the communications server 826 may also be used to communicate through the network 824 with a social networking server 836. The social networking server 836 may include or may interact with a social networking graph 838 that defines connections in a social network. Furthermore, the communications server 826 may connect to the social networking server 836 for various purposes, such as retrieving connection information, messaging history, event details, etc. from the social network.

A user of the client 810 may be an individual (human user), an entity (e.g., an enterprise, business, or third-party application), or a group (e.g., of individuals or entities) that interacts or communicates with or over the social networking server 836. The social-networking server 836 may be a network-addressable computing system hosting an online social network. The social networking server 836 may generate, store, receive, and send social-networking data, such as, for example, user-profile data, concept-profile data, social-graph information, or other suitable data related to the online social network. The social networking server 836 may be accessed by the other components of the network environment either directly or via the network 824.

The social networking server 836 may include an authorization server (or other suitable component(s)) that allows users to opt in to or opt out of having their actions logged by social-networking server 836 or shared with other systems (e.g., third-party systems, such as the messaging server 826), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 836 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 838. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 836 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 836 may send a request to the data store for the object. The request may identify the user associated with the request. The requested data object may only be sent to the user (or a client system 810 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social-networking server 836 or explicit connections of a user to a node, object, entity, brand, or page on social networking server 836. In addition, or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 8A may be well-suited to deployment as a new system or as an upgrade to an existing system, because the logic is incorporated into the messaging server 826. In contrast, FIG. 8B depicts an exemplary distributed messaging system 850, in which functionality for selecting dominant/relevant participants and displaying a reduced-size interface is distributed and remotely accessible from the messaging server. Examples of a distributed system 850 include a client-server architecture, a 3-tier architecture, an N-tier architecture, a tightly-coupled or clustered architecture, a peer-to-peer architecture, a master-slave architecture, a shared database architecture, and other types of distributed systems.

Many of the components depicted in FIG. 8B are identical to those in FIG. 8A, and a description of these elements is not repeated here for the sake of brevity. The primary difference between the centralized embodiment and the distributed embodiment is the addition of a separate communication server 852, which hosts the media effect aggregation logic 832 and the context-based media effect logic 834. The communication server 852 may be distinct from the communications server 826 but may communicate with the communications server 826, either directly or through the network 824, to provide the functionality of the media effect aggregation logic 832 and the context-based media effect logic 834 to the messaging server 826.

The embodiment depicted in FIG. 8B may be particularly well suited to allow exemplary embodiments to be deployed alongside existing messaging systems, for example when it is difficult or undesirable to replace an existing messaging server. Additionally, in some cases the communications server 826 may have limited resources (e.g. processing or memory resources) that limit or preclude the addition of the additional pivot functionality. In such situations, the capabilities described herein may still be provided through the separate communications server 852.

FIG. 8C illustrates an example of a social networking graph 838. In exemplary embodiments, a social networking service may store one or more social graphs 838 in one or more data stores as a social graph data structure via the social networking service.

The social graph 838 may include multiple nodes, such as user nodes 854 and concept nodes 856. The social graph 838 may furthermore include edges 858 connecting the nodes. The nodes and edges of social graph 838 may be stored as data objects, for example, in a data store (such as a social-graph database). Such a data store may include one or more searchable or queryable indexes of nodes or edges of social graph 838.

The social graph 838 may be accessed by a social-networking server 826, client system 810, third-party system, or any other approved system or device for suitable applications.

A user node 854 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 854 corresponding to the user, and store the user node 854 in one or more data stores. Users and user nodes 854 described herein may, where appropriate, refer to registered users and user nodes 854 associated with registered users. In addition or as an alternative, users and user nodes 854 described herein may, where appropriate, refer to users that have not registered with the social-networking system. In particular embodiments, a user node 854 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 854 may be associated with one or more data objects corresponding to information associated with a user. In particular embodiments, a user node 854 may correspond to one or more webpages. A user node 854 may be associated with a unique user identifier for the user in the social-networking system.

In particular embodiments, a concept node 856 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 556 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 856 may be associated with one or more data objects corresponding to information associated with concept node 856. In particular embodiments, a concept node 856 may correspond to one or more webpages.

In particular embodiments, a node in social graph 838 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 856. Profile pages may be viewable by all or a selected subset of other users. As an example and not by way of limitation, a user node 854 may have a corresponding user-profile page in which the corresponding user may add content, make declarations, or otherwise express himself or herself. A business page may comprise a user-profile page for a commerce entity. As another example and not by way of limitation, a concept node 856 may have a corresponding concept-profile page in which one or more users may add content, make declarations, or express themselves, particularly in relation to the concept corresponding to concept node 856.

In particular embodiments, a concept node 856 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 854 corresponding to the user and a concept node 856 corresponding to the third-party webpage or resource and store edge 858 in one or more data stores.

In particular embodiments, a pair of nodes in social graph 838 may be connected to each other by one or more edges 858. An edge 858 connecting a pair of nodes may represent a relationship between the pair of nodes. In particular embodiments, an edge 858 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 858 connecting the first user's user node 854 to the second user's user node 854 in social graph 838 and store edge 858 as social-graph information in one or more data stores. In the example of FIG. 8C, social graph 838 includes an edge 858 indicating a friend relation between user nodes 854 of user "Amanda" and user "Dorothy." Although this disclosure describes or illustrates particular edges 858 with particular attributes connecting particular user nodes 854, this disclosure contemplates any suitable edges 858 with any suitable attributes connecting user nodes 854. As an example and not by way of limitation, an edge 858 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 838 by one or more edges 858.

In particular embodiments, an edge 858 between a user node 854 and a concept node 856 may represent a particular action or activity performed by a user associated with user node 854 toward a concept associated with a concept node 856. As an example and not by way of limitation, as illustrated in FIG. 8C, a user may "like," "attended," "played," "listened," "cooked," "worked at," or "watched" a concept, each of which may correspond to an edge type or subtype. A concept-profile page corresponding to a concept node 856 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 858 and a "used" edge (as illustrated in FIG. 8C) between user nodes 854 corresponding to the user and concept nodes 856 corresponding to the song and application to indicate that the user listened to the song and used the application. Moreover, the social-networking system may create a "played" edge 858 (as illustrated in FIG. 8C) between concept nodes 856 corresponding to the song and the application to indicate that the particular song was played by the particular application. In this case, "played" edge 858 corresponds to an action performed by an external application (SPOTIFY) on an external audio file (the song "Across the Sea"). Although this disclosure describes particular edges 858 with particular attributes connecting user nodes 854 and concept nodes 856, this disclosure contemplates any suitable edges 858 with any suitable attributes connecting user nodes 854 and concept nodes 856. Moreover, although this disclosure describes edges between a user node 854 and a concept node 856 representing a single relationship, this disclosure contemplates edges between a user node 854 and a concept node 856 representing one or more relationships. As an example and not by way of limitation, an edge 858 may represent both that a user likes and has used at a particular concept. Alternatively, another edge 858 may represent each type of relationship (or multiples of a single relationship) between a user node 854 and a concept node 856 (as illustrated in FIG. 8C between user node 854 for user "Edwin" and concept node 856 for "SPOTIFY").

In particular embodiments, the social-networking system may create an edge 858 between a user node 854 and a concept node 856 in social graph 838. As an example and not by way of limitation, a user viewing a concept-profile page (such as, for example, by using a web browser or a special-purpose application hosted by the user's client system) may indicate that he or she likes the concept represented by the concept node 856 by clicking or selecting a "Like" icon, which may cause the user's client system to send to the social-networking system a message indicating the user's liking of the concept associated with the concept-profile page. In response to the message, the social-networking system may create an edge 858 between user node 854 associated with the user and concept node 856, as illustrated by "like" edge 858 between the user and concept node 856. In particular embodiments, the social-networking system may store an edge 858 in one or more data stores. In particular embodiments, an edge 858 may be automatically formed by the social-networking system in response to a particular user action. As an example and not by way of limitation, if a first user uploads a picture, watches a movie, or listens to a song, an edge 858 may be formed between user node 854 corresponding to the first user and concept nodes 856 corresponding to those concepts. Although this disclosure describes forming particular edges 858 in particular manners, this disclosure contemplates forming any suitable edges 858 in any suitable manner.

The social graph 838 may further comprise a plurality of product nodes. Product nodes may represent particular products that may be associated with a particular business. A business may provide a product catalog to a consumer-to-business service and the consumer-to-business service may therefore represent each of the products within the product in the social graph 838 with each product being in a distinct product node. A product node may comprise information relating to the product, such as pricing information, descriptive information, manufacturer information, availability information, and other relevant information. For example, each of the items on a menu for a restaurant may be represented within the social graph 838 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 838. The information for a product node may be manipulated by the social-networking system as a product object that encapsulates information regarding the referenced product.

As such, the social graph 838 may be used to infer shared interests, shared experiences, or other shared or common attributes of two or more users of a social-networking system. For instance, two or more users each having an edge to a common business, product, media item, institution, or other entity represented in the social graph 838 may indicate a shared relationship with that entity, which may be used to suggest customization of a use of a social-networking system, including a messaging system, for one or more users.

The embodiments described above may be performed by a messaging architecture, an example of which is next described with reference to FIG. 9.

Messaging Architecture

Figure 9:
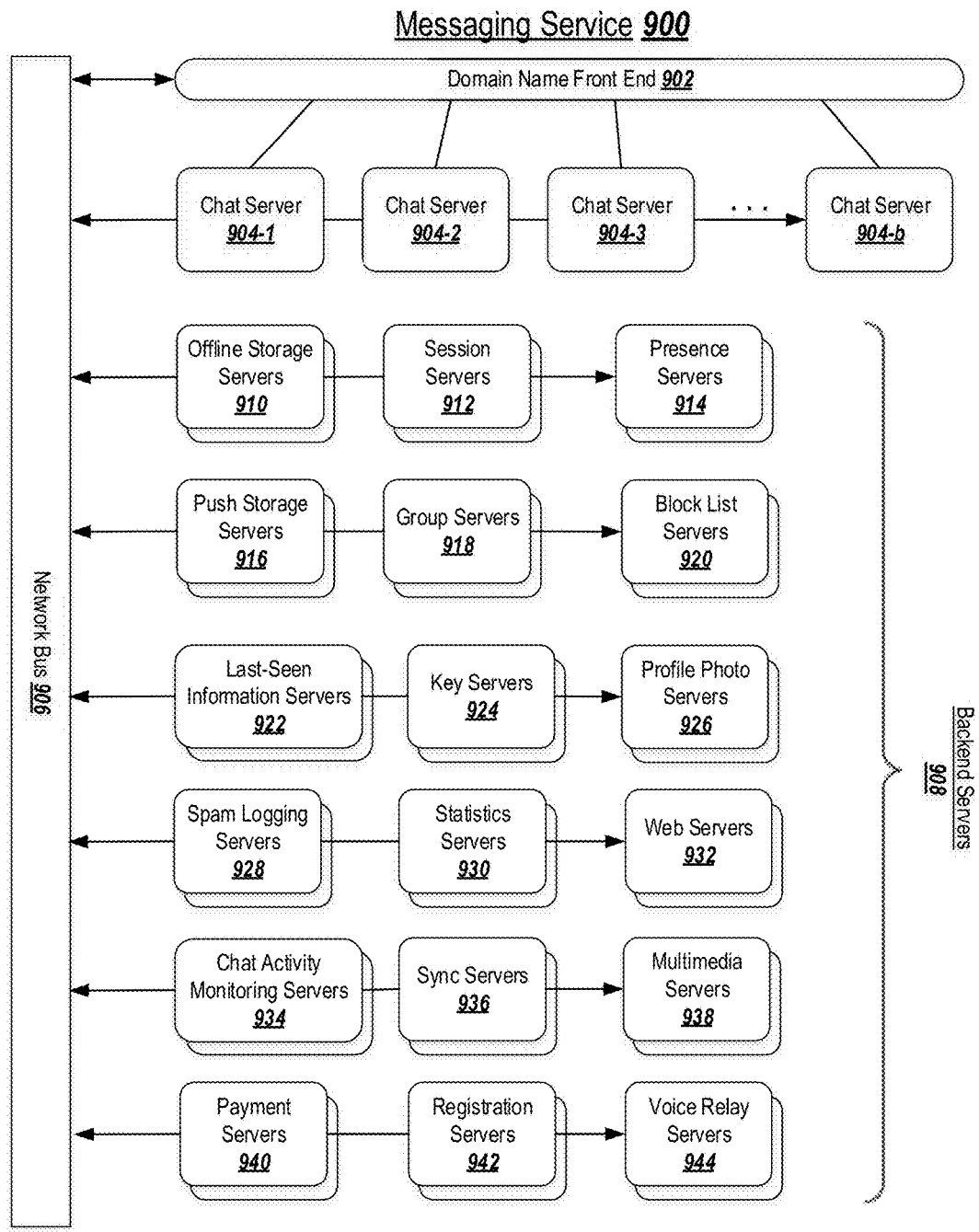
FIG. 9 is a block diagram depicting an example of a system for a messaging service.

FIG. 9 illustrates an embodiment of a plurality of servers implementing various functions of a messaging service 900 suitable for use with exemplary embodiments. It will be appreciated that different distributions of work and functions may be used in various embodiments of a messaging service 900.

The messaging service 900 may comprise a domain name front end 902. The domain name front end 902 may be assigned one or more domain names associated with the messaging service 900 in a domain name system (DNS). The domain name front end 902 may receive incoming connections and distribute the connections to servers providing various messaging services.

The messaging service 902 may comprise one or more chat servers 904. The chat servers 904 may comprise front-end servers for receiving and transmitting user-to-user messaging updates such as chat messages. Incoming connections may be assigned to the chat servers 904 by the domain name front end 902 based on workload balancing.

The messaging service 900 may comprise backend servers 908. The backend servers 908 may perform specialized tasks in the support of the chat operations of the front-end chat servers 904. A plurality of different types of backend servers 908 may be used. It will be appreciated that the assignment of types of tasks to different backend serves 908 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 900 may comprise one or more offline storage servers 910. The one or more offline storage servers 910 may store messaging content for currently-offline messaging clients in hold for when the messaging clients reconnect.

The messaging service 900 may comprise one or more sessions servers 912. The one or more session servers 912 may maintain session state of connected messaging clients.

The messaging service 900 may comprise one or more presence servers 914. The one or more presence servers 914 may maintain presence information for the messaging service 900. Presence information may correspond to user-specific information indicating whether or not a given user has an online messaging client and is available for chatting, has an online messaging client but is currently away from it, does not have an online messaging client, and any other presence state.

The messaging service 900 may comprise one or more push storage servers 916. The one or more push storage servers 916 may cache push requests and transmit the push requests to messaging clients. Push requests may be used to wake messaging clients, to notify messaging clients that a messaging update is available, and to otherwise perform server-side-driven interactions with messaging clients.

The messaging service 900 may comprise one or more group servers 918. The one or more group servers 918 may maintain lists of groups, add users to groups, remove users from groups, and perform the reception, caching, and forwarding of group chat messages.

The messaging service 900 may comprise one or more block list servers 920. The one or more block list servers 920 may maintain user-specific block lists, the user-specific incoming-block lists indicating for each user the one or more other users that are forbidden from transmitting messages to that user. Alternatively or additionally, the one or more block list servers 920 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 900 may comprise one or more last seen information servers 922. The one or more last seen information servers 922 may receive, store, and maintain information indicating the last seen location, status, messaging client, and other elements of a user's last seen connection to the messaging service 900.

The messaging service 900 may comprise one or more key servers 924. The one or more key servers may host public keys for public/private key encrypted communication.

The messaging service 900 may comprise one or more profile photo servers 926. The one or more profile photo servers 926 may store and make available for retrieval profile photos for the plurality of users of the messaging service 900.

The messaging service 900 may comprise one or more spam logging servers 928. The one or more spam logging servers 928 may log known and suspected spam (e.g., unwanted messages, particularly those of a promotional nature). The one or more spam logging servers 928 may be operative to analyze messages to determine whether they are spam and to perform punitive measures, in some embodiments, against suspected spammers (users that send spam messages).

The messaging service 900 may comprise one or more statistics servers 930. The one or more statistics servers may compile and store statistics information related to the operation of the messaging service 900 and the behavior of the users of the messaging service 900.

The messaging service 900 may comprise one or more web servers 932. The one or more web servers 932 may engage in hypertext transport protocol (HTTP) and hypertext transport protocol secure (HTTPS) connections with web browsers.

The messaging service 900 may comprise one or more chat activity monitoring servers 934. The one or more chat activity monitoring servers 934 may monitor the chats of users to determine unauthorized or discouraged behavior by the users of the messaging service 900. The one or more chat activity monitoring servers 934 may work in cooperation with the spam logging servers 928 and block list servers 920, with the one or more chat activity monitoring servers 934 identifying spam or other discouraged behavior and providing spam information to the spam logging servers 928 and blocking information, where appropriate to the block list servers 920.

The messaging service 900 may comprise one or more sync servers 936. The one or more sync servers 936 may sync the messaging system 500 with contact information from a messaging client, such as an address book on a mobile phone, to determine contacts for a user in the messaging service 900.

The messaging service 900 may comprise one or more multimedia servers 938. The one or more multimedia servers may store multimedia (e.g., images, video, audio) in transit between messaging clients, multimedia cached for offline endpoints, and may perform transcoding of multimedia.

The messaging service 900 may comprise one or more payment servers 940. The one or more payment servers 940 may process payments from users. The one or more payment servers 940 may connect to external third-party servers for the performance of payments.

The messaging service 900 may comprise one or more registration servers 942. The one or more registration servers 942 may register new users of the messaging service 900.

The messaging service 900 may comprise one or more voice relay servers 944. The one or more voice relay servers 944 may relay voice-over-internet-protocol (VoIP) voice communication between messaging clients for the performance of VoIP calls.

Figure 10:
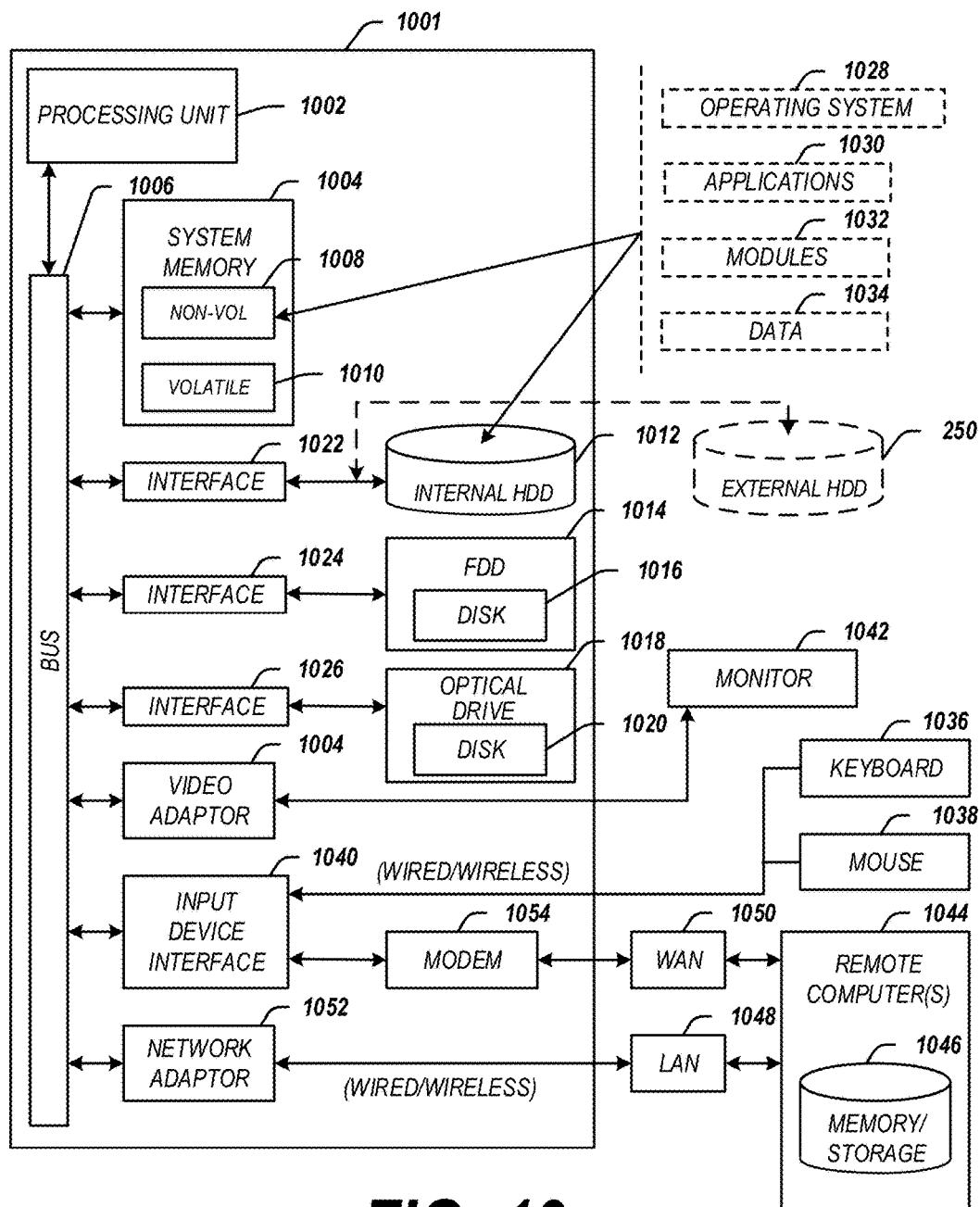
FIG. 10 is a block diagram illustrating an exemplary computing device suitable for use with exemplary embodiments.

The above-described methods may be embodied as instructions on a computer readable medium or as part of a computing architecture. FIG. 10 illustrates an embodiment of an exemplary computing architecture 1000 suitable for implementing various embodiments as previously described. In one embodiment, the computing architecture 1000 may comprise or be implemented as part of an electronic device, such as a computer 1001. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1002, a system memory 1004 and a system bus 1006. The processing unit 1002 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1002.

The system bus 1006 provides an interface for system components including, but not limited to, the system memory 1004 to the processing unit 1002. The system bus 1006 can be any of several types of bus structure that may further interconnect to a memory bus (with or without a memory controller), a peripheral bus, and a local bus using any of a variety of commercially available bus architectures. Interface adapters may connect to the system bus 1006 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1004 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1004 can include non-volatile memory 1008 and/or volatile memory 1010. A basic input/output system (BIOS) can be stored in the non-volatile memory 1008.

The computing architecture 1000 may include various types of computer-readable storage media in the form of one or more lower speed memory units, including an internal (or external) hard disk drive (HDD) 1012, a magnetic floppy disk drive (FDD) 1014 to read from or write to a removable magnetic disk 1016, and an optical disk drive 1018 to read from or write to a removable optical disk 1020 (e.g., a CD-ROM or DVD). The HDD 1012, FDD 1014 and optical disk drive 1020 can be connected to the system bus 1006 by an HDD interface 1022, an FDD interface 1024 and an optical drive interface 1026, respectively. The HDD interface 1022 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 1008, 1012, including an operating system 1028, one or more application programs 1030, other program modules 1032, and program data 1034. In one embodiment, the one or more application programs 1030, other program modules 1032, and program data 1034 can include, for example, the various applications and/or components of the messaging system 500.

A user can enter commands and information into the computer 1001 through one or more wire/wireless input devices, for example, a keyboard 1036 and a pointing device, such as a mouse 1038. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1002 through an input device interface 1040 that is coupled to the system bus 1006, but can be connected by other interfaces such as a parallel port, IEEE 694 serial port, a game port, a USB port, an IR interface, and so forth.

A monitor 1042 or other type of display device is also connected to the system bus 1006 via an interface, such as a video adaptor 1044. The monitor 1042 may be internal or external to the computer 1001. In addition to the monitor 1042, a computer typically includes other peripheral output devices, such as speakers, printers, and so forth.

The computer 1001 may operate in a networked environment using logical connections via wire and/or wireless communications to one or more remote computers, such as a remote computer 1044. The remote computer 1044 can be a workstation, a server computer, a router, a personal computer, portable computer, microprocessor-based entertainment appliance, a peer device or other common network node, and typically includes many or all of the elements described relative to the computer 1001, although, for purposes of brevity, only a memory/storage device 1046 is illustrated. The logical connections depicted include wire/wireless connectivity to a local area network (LAN) 1048 and/or larger networks, for example, a wide area network (WAN) 1050. Such LAN and WAN networking environments are commonplace in offices and companies, and facilitate enterprise-wide computer networks, such as intranets, all of which may connect to a global communications network, for example, the Internet.

When used in a LAN networking environment, the computer 1001 is connected to the LAN 1048 through a wire and/or wireless communication network interface or adaptor 1052. The adaptor 1052 can facilitate wire and/or wireless communications to the LAN 1048, which may also include a wireless access point disposed thereon for communicating with the wireless functionality of the adaptor 1052.

When used in a WAN networking environment, the computer 1001 can include a modem 1054, or is connected to a communications server on the WAN 1050, or has other means for establishing communications over the WAN 1050, such as by way of the Internet. The modem 1054, which can be internal or external and a wire and/or wireless device, connects to the system bus 1006 via the input device interface 1040. In a networked environment, program modules depicted relative to the computer 1001, or portions thereof, can be stored in the remote memory/storage device 1046. It will be appreciated that the network connections shown are exemplary and other means of establishing a communications link between the computers can be used.

The computer 1001 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
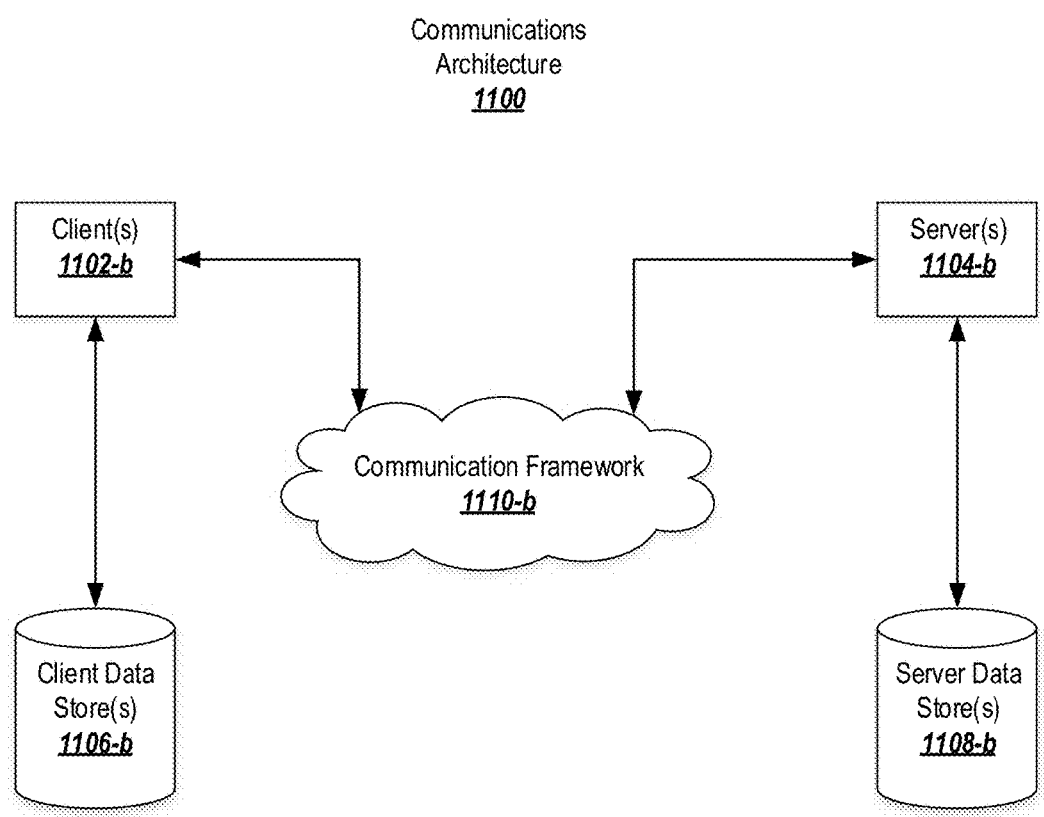
FIG. 11 depicts an exemplary communication architecture.

FIG. 11 is a block diagram depicting an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 includes one or more clients 1102 and servers 1104. The clients 1102 may implement the client device 510. The servers 1104 may implement the server device 526. The clients 1102 and the servers 1104 are operatively connected to one or more respective client data stores 1106 and server data stores 1108 that can be employed to store information local to the respective clients 1102 and servers 1104, such as cookies and/or associated contextual information.

The clients 1102 and the servers 1104 may communicate information between each other using a communication framework 1110. The communications framework 1110 may implement any well-known communications techniques and protocols. The communications framework 1110 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1110 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 12:
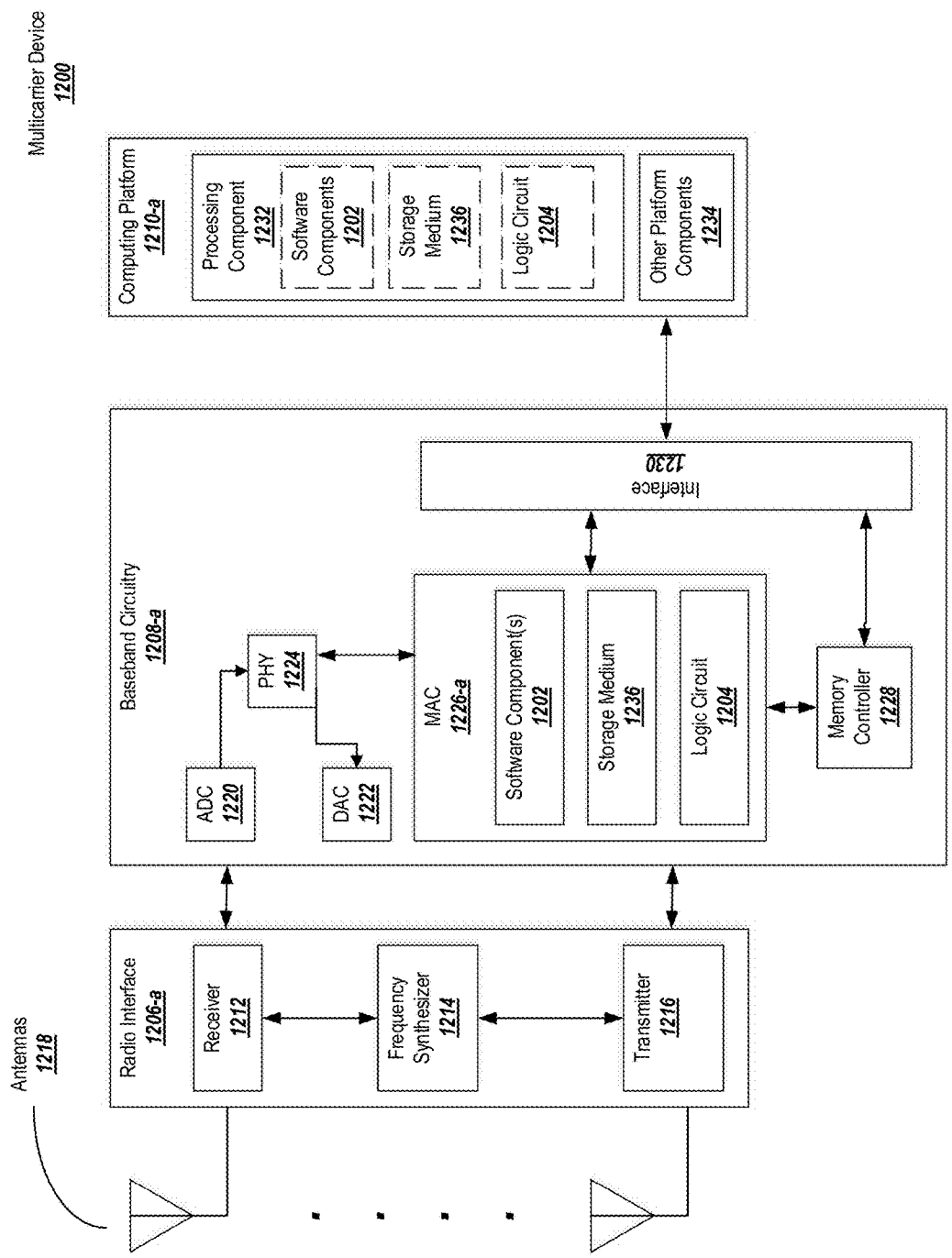
FIG. 12 is a block diagram depicting an exemplary multicarrier communications device.

FIG. 12 illustrates an embodiment of a device 1200 for use in a multicarrier OFDM system, such as the messaging system 500. The device 1200 may implement, for example, software components 1202 as described with reference to the messaging component logic 600, the intent determination logic 700, and the group selection logic 800. The device 1200 may also implement a logic circuit 1204. The logic circuit 1204 may include physical circuits to perform operations described for the messaging system 500. As shown in FIG. 12, device 1200 may include a radio interface 1206, baseband circuitry 1208, and a computing platform 1210, although embodiments are not limited to this configuration.

The device 1200 may implement some or all of the structure and/or operations for the messaging system 500 and/or logic circuit 1204 in a single computing entity, such as entirely within a single device. Alternatively, the device 1200 may distribute portions of the structure and/or operations for the messaging system 500 and/or logic circuit 1204 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 1206 may include a component or combination of components adapted for transmitting and/or receiving single carrier or multicarrier modulated signals (e.g., including complementary code keying (CCK) and/or orthogonal frequency division multiplexing (OFDM) symbols) although the embodiments are not limited to any specific over-the-air interface or modulation scheme. The radio interface 1206 may include, for example, a receiver 1212, a transmitter 1214 and/or a frequency synthesizer 1216. The radio interface 1206 may include bias controls, a crystal oscillator and/or one or more antennas 1218. In another embodiment, the radio interface 1206 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 1208 may communicate with the radio interface 1206 to process receive and/or transmit signals and may include, for example, an analog-to-digital converter 1220 for down converting received signals, and a digital-to-analog converter 1222 for up-converting signals for transmission. Further, the baseband circuitry 1208 may include a baseband or physical layer (PHY) processing circuit 1224 for PHY link layer processing of respective receive/transmit signals. The baseband circuitry 1208 may include, for example, a processing circuit 1226 for medium access control (MAC)/data link layer processing. The baseband circuitry 1208 may include a memory controller 1228 for communicating with the processing circuit 1226 and/or a computing platform 1210, for example, via one or more interfaces 1230.

In some embodiments, the PHY processing circuit 1224 may include a frame construction and/or detection module, in combination with additional circuitry such as a buffer memory, to construct and/or deconstruct communication frames, such as radio frames. Alternatively or in addition, the MAC processing circuit 1226 may share processing for certain of these functions or perform these processes independent of the PHY processing circuit 1224. In some embodiments, MAC and PHY processing may be integrated into a single circuit.

The computing platform 1210 may provide computing functionality for the device 1200. As shown, the computing platform 1210 may include a processing component 1232. In addition to, or alternatively of, the baseband circuitry 1208, the device 1200 may execute processing operations or logic for the messaging system 500 and logic circuit 1204 using the processing component 1232. The processing component 1232 (and/or the PHY 1224 and/or MAC 1226) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1210 may further include other platform components 1234. Other platform components 1234 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 1200 described herein, may be included or omitted in various embodiments of the device 1200, as suitably desired. In some embodiments, the device 1200 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 1200 may be implemented using single input single output (SISO) architectures. However, certain implementations may include multiple antennas (e.g., antennas 1218) for transmission and/or reception using adaptive antenna techniques for beamforming or spatial division multiple access (SDMA) and/or using MIMO communication techniques.

The components and features of the device 1200 may be implemented using any combination of discrete circuitry, application specific integrated circuits (ASICs), logic gates and/or single chip architectures. Further, the features of the device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 1236 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
    accessing a video stream;
    receiving an instruction to apply a media effect to the video stream;
    receiving input from a plurality of users relating to the media effect, the input associated with a plurality of vectors;
    accumulating the input across the plurality of users by adding the plurality of vectors together;
    modifying the media effect based on the accumulated input; and
    applying the modified media effect to the video stream.

2. The method of claim 1, the input comprising one or more of a viewership status or an engagement with the video stream.

3. The method of claim 1, the video stream comprising a video broadcast and the input comprising poll results of an audience of the video broadcast.

4. The method of claim 1, the video stream comprising a video broadcast associated with a broadcaster that originates the video broadcast, wherein the media effect changes the video broadcast automatically without input from the broadcaster.

5. The method of claim 1, wherein the media effect is associated with a plurality of tiers, and an increasing level of the input is associated with a higher-tier of the media effect.

6. The method of claim 1, further comprising determining whether the accumulated input exceeds a modification threshold, wherein the media effect is modified after the accumulated input exceeds the modification threshold.

7. A non-transitory computer-readable medium storing instructions configured to cause one or more processors to:
  access a video stream;
  receive an instruction to apply a media effect to the video stream;
  receive input from a plurality of users relating to the media effect, the input comprising one or more of a viewership status or an engagement with the video stream;
  accumulate the input across the plurality of users;
  modify the media effect based on the accumulated input; and
  apply the modified media effect to the video stream, wherein:
    the input is associated with a plurality of vectors, and accumulating the input comprises adding the vectors together, or
    the media effect is associated with a plurality of tiers, and an increasing level of the input is associated with a higher-tier of the media effect.

8. The medium of claim 7, the video stream comprising a video broadcast and the input comprising poll results of an audience of the video broadcast.

9. The medium of claim 7, the video stream comprising a video broadcast associated with a broadcaster that originates the video broadcast, wherein the media effect changes the video broadcast automatically without input from the broadcaster.

10. The medium of claim 7, further storing instructions configured to cause the one or more processors to determine whether the accumulated input exceeds a modification threshold, wherein the media effect is modified after the accumulated input exceeds the modification threshold.

11. An apparatus comprising:
  a non-transitory computer readable medium configured to store instructions for facilitating a video communication; and
  a processor configured to execute the instructions, the instructions configured to cause the processor to:
    access a video stream;
    receive an instruction to apply a media effect to the video stream, wherein the media effect is associated with a plurality of tiers;
    receive input from a plurality of users relating to the media effect;
    accumulate the input across the plurality of users;
    modify the media effect based on the accumulated input, wherein an increasing level of the input is associated with a higher-tier of the media effect; and
    apply the modified media effect to the video stream.

12. The apparatus of claim 11, the input associated with a plurality of vectors, wherein accumulating the input comprises adding the vectors together.

13. The apparatus of claim 11, the input comprising one or more of a viewership status or an engagement with the video stream.

14. The apparatus of claim 11, the video stream comprising a video broadcast associated with a broadcaster that originates the video broadcast, wherein the media effect changes the video broadcast automatically without input from the broadcaster.

15. The apparatus of claim 11, further storing instructions configured to cause processor to determine whether the accumulated input exceeds a modification threshold, wherein the media effect is modified after the accumulated input exceeds the modification threshold.

* * * * *